US012810241B2

(12) United States Patent
Al-Madani et al.

(10) Patent No.: US 12,810,241 B2
(45) Date of Patent: Nov. 24, 2026

(54) MIDDLEWARE-BASED UAV-UGB LOGISTICS SYSTEM

(71) Applicant: KING FAHD UNIVERSITY OF PETROLEUM AND MINERALS, Dhahran (SA)

(72) Inventors: Basem Al-Madani, Dhahran (SA); Hanin Alyahya, Dhahran (SA); Sameha Alghurabi, Khobar (SA); Farouq Muhammad Aliyu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 375 days.

(21) Appl. No.: 18/503,757

(22) Filed: Nov. 7, 2023

(65) Prior Publication Data

US 2025/0148414 A1 May 8, 2025

(51) Int. Cl.

*G06Q 10/087* (2023.01)
*B65G 1/137* (2006.01)
*G08G 7/00* (2006.01)

(52) U.S. Cl.

CPC ......... *G06Q 10/087* (2013.01); *B65G 1/1373* (2013.01); *G08G 7/00* (2013.01)

(58) Field of Classification Search

CPC ... G06Q 10/087; G06Q 10/083; B65G 1/1373
See application file for complete search history.

(56) References Cited

U.S. PATENT DOCUMENTS 12,269,682 B2 * 4/2025 Velagapudi .......... B65G 1/0485
12,314,060 B2 * 5/2025 Cella ...................... G06Q 50/04
(Continued)

FOREIGN PATENT DOCUMENTS

EP 3 448 753 B1 7/2022

OTHER PUBLICATIONS

Basem Al-Madani, et al., "DDS-Based Containment Control of Multiple UAV Systems", Applied Sciences, vol. 10, No. 13: 4572, Jul. 1, 2020, pp. 1-18.
(Continued)

*Primary Examiner* — Patrick H Mackey
(74) *Attorney, Agent, or Firm* — Oblon, McClelland, Maier & Neustadt, L.L.P.

(57) ABSTRACT

The present disclosure describes an autonomous warehouse package delivery system. The system includes a warehouse, a plurality of unmanned ground vehicles (UGV), a plurality of UAVs, and a plurality of servers. The warehouse includes a U-shaped conveyor belt, a plurality of shelving units, a plurality of package stacks, a first plurality of robots, and a second plurality of robots. Each UGV autonomously pick-ups a package from a shelf, navigates to the UAV landing pads, and places the package on the UAV landing pad. The plurality of UAVs travel to the UAV landing pad and pick up a package, autonomously fly to a package delivery address and release the package at the package delivery address. A real-time data distribution middleware network is connected to the U-shaped conveyor belt, the first plurality of robots, the second plurality of robots, the plurality of UGVs, the plurality of UAVs and a plurality of servers.

19 Claims, 11 Drawing Sheets

(56) References Cited

U.S. PATENT DOCUMENTS

| | | | | |
|---|---|---|---|---|
| 12,503,308 | B2 * | 12/2025 | Douglas | B25J 9/0093 |
| 12,561,659 | B2 * | 2/2026 | Cella | G06Q 10/0633 |
| 2016/0033966 | A1 | 2/2016 | Farris et al. | |
| 2017/0011340 | A1 | 1/2017 | Gabbai | |
| 2017/0043953 | A1 * | 2/2017 | Battles | G06Q 10/087 |
| 2019/0079509 | A1 | 3/2019 | Bosworth | |
| 2024/0308769 | A1 * | 9/2024 | Traina | B65G 1/1375 |
| 2024/0394643 | A1 * | 11/2024 | Kristensen | B66C 17/06 |
| 2026/0048941 | A1 * | 2/2026 | Menigoz | B65G 1/065 |

OTHER PUBLICATIONS

Shrutarv Awasthi, et al., "UAVs for Industries and Supply Chain Management", Proceedings of the XXIV International Conference on "Material Handling, Constructions and Logistics" (MHCL'22), Dec. 2022, 6 pages.

Juan López, et al., "A Middleware Architecture for Unmanned Aircraft Avionics", MC '07: Proceedings of the 2007 ACM/IFIP/USENIX International Conference on Middleware Companion, Article No. 24, Nov. 2007, pp. 1-6.

Rob A. Rutenbar, "Simulated Annealing Algorithms: An Overview", IEEE Circuits and Devices Magazine, Jan. 1989, pp. 19-26.

"What is DDS?", DDS Foundation, https://www.dds-foundation.org/what-is-dds-3/, 1997-2023, 6 pages.

* cited by examiner

MIDDLEWARE-BASED UAV-UGB LOGISTICS SYSTEM

BACKGROUND

Technical Field

The present disclosure is directed to systems and methods for autonomous warehouse communication for package handling and delivery.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Logistics systems consider various types of delivery methods to determine the most efficient route from a pickup location to a delivery location. For instance, a person might collect a parcel from the pickup location and transport it to a sorting facility where it is loaded onto a ground vehicle or an aircraft for delivery to another sorting facility. The package may then be picked up by another person and delivered to the final delivery location. Delivering packages from the vendor to the customer is a part of logistics. The process of delivering packages has undergone significant changes over the years. With technological advancements, several challenges have been successfully addressed, such as the growing demand for delivery services, the need to expand delivery areas, reduce delivery time and costs and improve delivery efficiency.

With the massive development in the logistics field and to further improve the customer shopping experience, numerous online retailers provide city-wide same-day delivery services in order to guarantee that the consumer receives their shipment within predefined time. Therefore, the balance between delivery speed and operating costs for city-wide package deliveries is challenging for logistic organizations. A greater number of personnel and trucks, and more frequent deliveries are typically required to increase delivery speed. However, the use of vehicles and trucks for traditional shipping has resulted in high amounts of carbon dioxide and environmental harm. Traditional delivery techniques (such as delivery by automobile) have a similar serious disadvantage to road transportation in that they are subject to unforeseen traffic and geographic difficulties. Indeed, to overcome these obstacles, there is an urgent need for the emergence of new methods that take advantage of technological advances. To meet the increasing demand for delivery and to increase package transport efficiency, unmanned aerial vehicles (UAVs) have been employed to transport packages. UAVs have several advantages, such as the ability to avoid road traffic and to adopt the shortest path between the pickup location and the delivery location. UAVs are not constrained to the inherent restrictions of conventional land-based delivery methods.

Modern logistics services are distinguished by the automation of procedures including organizing warehouses, transfers, deliveries, and product retrieval made by employing robots (air or ground) and machines along with intelligent systems. Industrial robots differ from conventional machinery in that they are connected to artificial intelligence (AI) systems that allow them to handle more complex variables and react quickly and independently utilizing algorithms.

An efficient doorstep delivery system using a stochastic programming model has been described (See: Sawadsitang, S., Niyato, D., Tan, P. S., & Wang, P., "*Joint Ground and Aerial Package Delivery Services: A Stochastic Optimization Approach*", IEEE Transactions on Intelligent Transportation Systems, 20(6), 22412254). This system chooses either a drone or a truck such that delivery time and cost are minimized but does not use any middleware as there is little communication between the hosts.

An unmanned ground vehicle (UGV) UAV system for construction site monitoring has been described. The UAV helps inform the UGV of the floor plan to increase the efficiency of obstacle avoidance using the RRT algorithm. (See: Asadi, Khashayar, et al. "*An Integrated UGV—UAV System for Construction Site Data Collection*," Automation in Construction, vol. 112, 2020, p. 103068). The UGV/UAV system uses waypoints provided by a system administrator, therefore there is no path planning.

A van-UAV delivery system, which uses the multiple traveling salesman problem-location-allocation problem (mTSP-LAP) technique has been described (See: Wang, Chuan, et al. "*On Optimizing a Multi-Mode Last-Mile Parcel Delivery System with Vans, Truck and Drone*" Electronics, vol. 10, no. 20, 2021, p. 2510). This system does not use middleware to enable real-time communication.

A consignment-free package delivery scheme that takes advantage of multi-hop ridesharing has been described (See: Chen, Yueyue, et al. "*PPtaxi: Non-Stop Package Delivery via Multi-Hop Ridesharing*" IEEE Transactions on Mobile Computing, vol. 19, no. 11, 2020, pp. 26842698). This system tends to unscheduled increases in latency since the passengers may change their minds. Furthermore, the system does not account for traffic at different times of the day.

U.S. Pat. No. 9,975,651B1 discloses an autonomous transfer station for transferring packages between UAVs and UGVs, as well as a reusable package-carrying container that is transferable between the UAVs and UGVs via the transfer station. However, this patent application fails to determine path planning and optimal distance as funnels which are used to release packages are fixed in place.

U.S. Pat. No. 9,894,327B1 describes a UAV-UGV data acquisition system. The UAVs and UGVs are equipped with sensors for data acquisition. Additionally, the UAVs can land on the UGVs for charging or to avoid hazardous environments. This patent does not use middleware to enable real-time communication.

None of the above references provides for warehouse package delivery communication among warehouse robots and unmanned ground vehicles with unmanned aerial vehicles to perform the package delivery.

Accordingly, there is a need for a package delivery system that provides doorstep package delivery using a middleware communication protocol, enabling enhanced communication between warehouse servers, a network administrator, the UGVs, and the UAVs and reducing human intervention in logistic processes.

SUMMARY

In an embodiment, an autonomous warehouse package delivery communication system is described. The autonomous warehouse package delivery communication system includes a U-shaped conveyor belt, a first plurality of robots, a second plurality of robots, a plurality of unmanned ground vehicles (UGVs), a plurality of unmanned aerial vehicles (UAVs), and a plurality of warehouse servers communicatively connected by a real-time data distribution middleware network. The real-time data distribution middleware network is configured to use a publish/subscribe protocol. A database is operatively connected to the plurality of warehouse servers. The database is configured to record a UGV location and an availability status of each of the UGVs, a UAV location and an availability status of each of the UAVs, a robot status of each of the first plurality of robots, a robot status of each of the second plurality of robots, a shelf location, an availability status of each package and a package identifier for each package. The plurality of warehouse servers are configured to receive a plurality of package orders each including a package delivery address, save the package order with the package delivery address in the database, and publish an order topic for each of the plurality of package orders. For each package order, the plurality of warehouse servers are configured to search the database to determine an availability of the package of the package order, retrieve the shelf location and the package identifier, subscribe to a UGV status topic of each of the UGVs, wherein the UGV status topic includes an availability and a location of each UGV, subscribe to a UAV status topic of each of the UAVs, wherein the UAV status topic includes an availability and a location of each UAV, determine, by a simulated annealing procedure, a UGV which is closest to the shelf location and available to retrieve the package and a UAV which is closest to the shelf location and available to deliver the package to the package delivery address, publish a UGV identifier of the UGV closest to the shelf location to a UGV package path topic, publish a UAV identifier of the UAV closest to the shelf location to a UAV path topic, and calculate a transfer path for the UGV closest to the shelf location to retrieve the package from the shelf location and deliver the package to a UAV landing pad for the UAV closest to the shelf location, and publish a UGV to UAV package path topic. Each UGV is configured to subscribe to the order topic, listen for its UGV identifier, retrieve the package identifier from the order topic, subscribe to the UGV package path topic, retrieve the transfer path, retrieve the package from the shelf location, subscribe to the UGV to UAV path topic, autonomously deliver the package to the UAV landing pad for the UAV closest to the shelf location, and publish on the package status topic that the package was delivered to the UAV landing pad. Each UAV is configured to subscribe to the package status topic, listen for its UAV identifier, subscribe to the package position topic, move to the UAV landing pad, pick up the package, publish the package identifier and update the package status on the package status topic and autonomously fly the package to the package delivery address, deliver the package and publish to the package status topic that the package was delivered.

In another exemplary embodiment, an autonomous warehouse package delivery system is described. The system includes a warehouse, a plurality of unmanned ground vehicles (UGV), a plurality of unmanned aerial vehicles (UAV) landing pads located outside of the warehouse, a plurality of warehouse servers and a real-time data distribution middleware network. The warehouse includes a U-shaped conveyor belt, a plurality of shelving units configured to store packages, a plurality of package stacks, a first plurality of robots, and a second plurality of robots. Each UGV is configured to autonomously pick up a package from the shelf, navigate to one of the UAV landing pads, and place the package on the UAV landing pad. The plurality of UAVs is configured to travel to the UAV landing pad and pick up a package from the UAV landing pad, autonomously fly to a package delivery address and release the package at the package delivery address. The real-time data distribution middleware network is connected to the U-shaped conveyor belt, the first plurality of robots, the second plurality of robots, the plurality of UGVs, the plurality of UAVs and the plurality of servers. The real-time data distribution middleware network is configured to use a publish/subscribe protocol to facilitate direct communication among the U-shaped conveyor belt, the first plurality of robots, the second plurality of robots, the plurality of UGVs, the plurality of UAVs and the plurality of servers.

In another exemplary embodiment, an autonomous warehouse package delivery communication method is described. The method includes connecting a real-time data distribution middleware network to a U-shaped conveyor belt, a first plurality of robots, a second plurality of robots, a plurality of unmanned ground vehicles (UGVs), a plurality of unmanned aerial vehicles (UAVs), and a plurality of warehouse servers. The method includes using, by the real-time data distribution middleware network, a publish/subscribe protocol to facilitate communication among the first plurality of robots, the second plurality of robots, the plurality of unmanned ground vehicles (UGVs), the plurality of unmanned aerial vehicles (UAVs), and the plurality of warehouse servers The method includes connecting a database to the plurality of warehouse servers, wherein the database is configured to record a UGV location and an availability status of each of the UGVs, a UAV location and an availability status of each of the UAVs, a robot status of each of the first plurality of robots, a robot status of each of the second plurality of robots, a shelf location, an availability status of each package and a package identifier for each package The method includes monitoring, by system administrator computer station operatively connected to the plurality of servers, the UGV location and availability status, the UAV location and availability status, the availability status of each package, a package inventory and ordering supplies of the package inventory The method includes receiving, by the plurality of warehouse servers, a plurality of package orders each including a package delivery address The method includes saving the package order with the package delivery address in the database The method includes publishing an order topic for each of the plurality of package orders. For each package order, the method includes searching the database to determine an availability of the package of the package order. The method includes retrieving the shelf location and the package identifier. The method includes subscribing to a UGV status topic of each of the UGVs, wherein the UGV status topic includes an availability and a location of each UGV. The method includes subscribing to a UAV status topic of each of the UAVs, wherein the UAV status topic includes an availability and a location of each UAV. The method includes determining, by a simulated annealing procedure, a UGV which is closest to the shelf location and available to retrieve the package and a UAV which is closest to the shelf location and available to deliver the package to the package delivery address. The method includes publishing a UGV identifier of the UGV closest to the shelf location to a UGV package path topic. The method includes publishing a UAV identifier of the UAV closest to the shelf location to a UAV path topic. The method includes calculating a transfer path for the UGV closest to the shelf location to retrieve the package from the shelf location and deliver the package to a UAV landing pad for the UAV closest to the shelf location, and publish a UGV to UAV package path topic. The method includes subscribing, by each UGV, to the order topic, listening for its UGV identifier, retrieving the package identifier from the order topic, subscribing to the UGV package path topic, retrieving the transfer path, retrieving the package from the shelf location, subscribing to the UGV to UAV path topic, autonomously delivering the package to the UAV landing pad for the UAV closest to the shelf location, and publishing on the package status topic that the package was delivered to the UAV landing pad. The method includes subscribing, by each UAV, to the package status topic, listening for its UAV identifier, subscribing to the package position topic, moving to the UAV landing pad, picking up the package, publishing the package identifier and updating the package status on the package status topic and autonomously flying the package to the package delivery address, delivering the package and publishing to the package status topic that the package was delivered.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
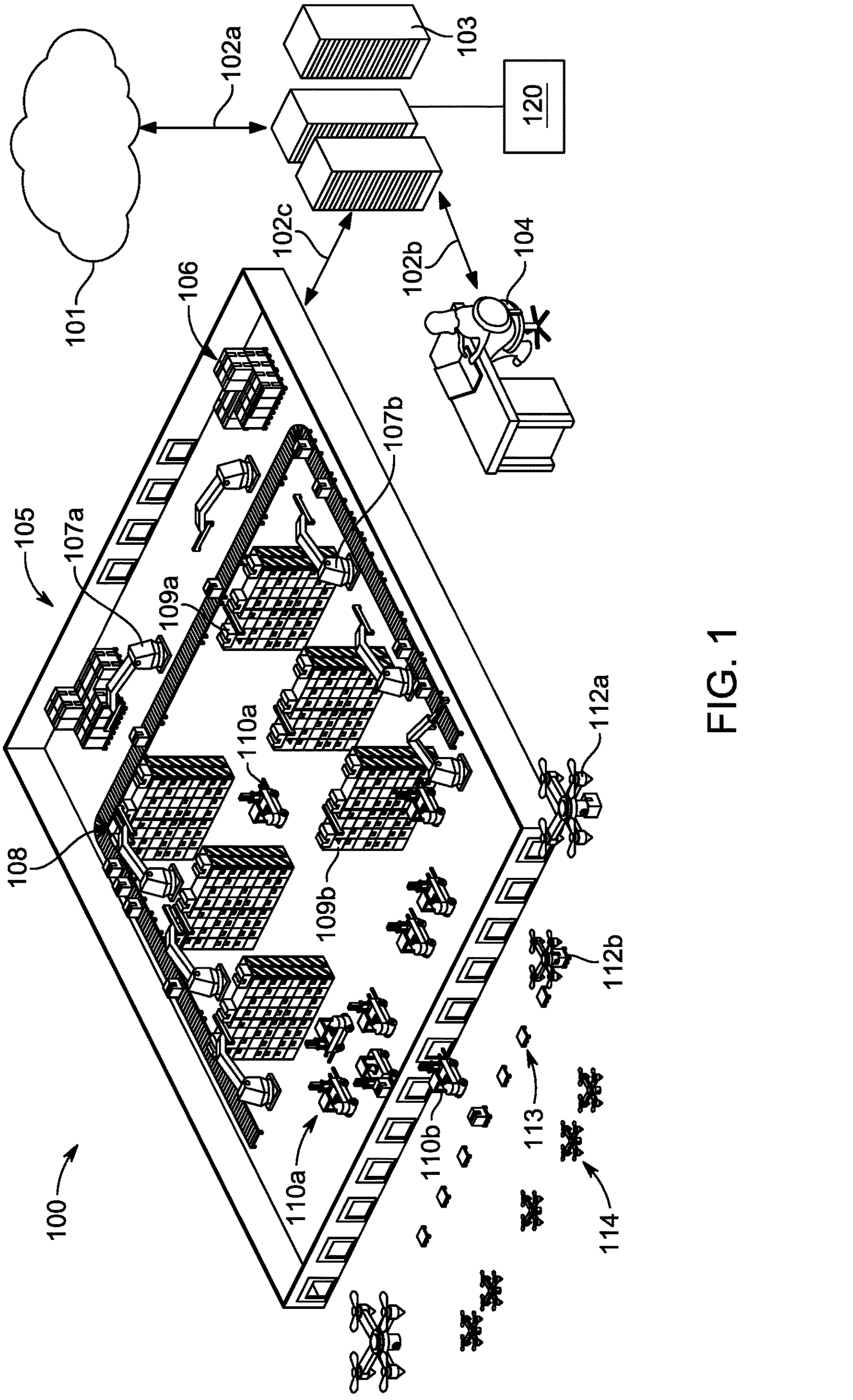
FIG. 1 illustrates an exemplary representation of an autonomous warehouse package delivery communication system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the present disclosure are directed to an autonomous warehouse package delivery communication system. The system employs unmanned aerial vehicles (UAVs) for doorstep delivery. The UAVs work in collaboration with unmanned ground vehicles (UGVs) and robots. The UGVs receive a package order, locate the package in the warehouse, and drop it at the UAVs landing pad. The UAVs then pick up the package and deliver it to the customer. The system uses real-time middleware that allows robots, UAVs, and UGVs, in the warehouse, to communicate effectively.

In various aspects of the disclosure, non-limiting definitions of one or more terms that will be used in the document are provided below.

The term "Data Distribution Service (DDS)" refers to a networking middleware protocol and API standard for data-centric connectivity that simplifies complex network programming. The DDS implements a publish-subscribe pattern for sending and receiving data, events, and commands among nodes. Nodes that produce information (publishers) create "topics" (e.g., status, location, coordinates) and publish the topic.

The term "Real Time Publish Subscribe (RTPS)" refers to a protocol for best effort and reliable publish-subscribe communications over unreliable transports such as UDP in both unicast and multicast.

The term "middleware" refers to a software that enables one or more kinds of communication or connectivity between two or more applications or application components in a distributed network.

The term "publisher" is an entity that is responsible for publishing data with a given QoS. The publisher can send data for several different topics with different data types. Multiple data writers may be owned and managed by a single publisher.

The term "subscriber" is an entity responsible for receiving a published data in the global data space (GDS) with a matching QoS. The subscriber can read data for numerous different topics with different data types. Multiple data readers are owned and managed by a single subscriber.

FIG. 1 illustrates an exemplary representation of an autonomous warehouse package delivery communication system (hereinafter interchangeably referred to as "the system 100"), according to one or more aspects of the present disclosure.

As shown in FIG. 1, the system 100 includes an intranet (*102b*, *102c*), a plurality of warehouse servers 103, a system administrator computer station 104, a warehouse 105, a U-shaped conveyor belt 108, a plurality of shelving units (*109a*, *109b*), a first plurality of robots *107a*, a second plurality of robots *107b*, a plurality of unmanned ground vehicles (UGVs) (*110a*, *110b*), a plurality of unmanned aerial vehicles (UAVs) (*112a*, *112b*), a package pickup area 113, a plurality of UAV landing pads 114, and a database 120. The system 100 is configured to receive a plurality of orders from a plurality of users, via internet 101.

The warehouse 105 includes the U-shaped conveyor belt 108, the first plurality of robots *107a*, the second plurality of robots *107b* and an inventory receiving area 106. The inventory receiving area 106 is configured to receive new orders (packages). The inventory receiving area 106 includes a number of package stacks which store the package inventory.

Each robot of the first plurality of robots 107*a* is located between a package stack and the U-shaped conveyor belt 108. Each robot of the first plurality of robots 107*a* is configured to remove a package from the package stack and place the package on the U-shaped conveyor belt 108.

Each robot of the second plurality of robots 107*b* is located at an assigned workstation between a respective shelving unit and the U-shaped conveyor belt 108. Each of the second plurality of robots 107*b* is configured to remove each package from the U-shaped conveyor belt 108 as the package arrives in front of the assigned workstation. Each of the second plurality of robots 107*b* is configured to place the removed package on one of the shelves of the respective shelving unit. After placing the package on one of the shelves, each robot of the second plurality of robots 107*b* is configured to publish a package position topic. For example, the package position topic includes a package identifier and a shelf location to the package position topic. For example, the first plurality of robots 107*a*, and the second plurality of robots 107*b* run on the robot operating system (ROS), which is a real-time operating system. The robot operating system is an open-source robotics middleware suite. The robots are responsible for shelving packages for storage as shown in FIG. 1. In an example, the shelves are arranged in a grid formation to allow the UGV to move efficiently among the shelves to remove packages from the shelves.

Each of the U-shaped conveyor belt 108, the first plurality of robots 107*a*, the second plurality of robots 107*b*, the plurality of UGVs (110*a*, 110*b*), the plurality of UAVs (112*a*, 112*b*), and the plurality of warehouse servers 103 are connected to a real-time data distribution middleware network via an intranet connection 102*c*.

As shown in FIG. 1, the plurality of warehouse servers 103 is connected to the system administrator computer station 104 via an intranet connection 102*b*. The data distribution middleware network is configured to enable the integration of various components (the first plurality of robots 107*a*, the second plurality of robots 107*b*, the plurality of UGVs (110*a*, 110*b*), the plurality of UAVs (112*a*, 112*b*), and the plurality of warehouse servers 103) using a data distribution middleware network, for example, a Data Distribution Service (DDS). For example, the data distribution middleware network allows each component (component, unit, UVA, UGV, system administrator) to connect directly (no upper layer and bottom layer). The data distribution middleware network adapts to the format/protocols of each component communication type. A component can be a publisher or a subscriber. Publishers and subscribers communicate by data packets called Topics. Each component (subscriber) can access only the subset of the stored data that is needed for it to function and does not have to download all the data on a topic and sort through it. A publisher generates data topics and a subscriber accesses data topics. Every component connects to the middleware. The publisher transmits a data topic onto the middleware. The data topic includes a message with an identifier of the publisher, the data topic info and a state. The subscriber listens to the broadcasts and accesses the topic when it needs the information. The data communication is checked for accuracy by a QoS policy in which an ACK is sent back from the subscriber to the publisher if there is any uncertainty in the data. The subscriber subscribes only to certain topics it wants to receive, so is not necessarily receiving everything broadcast. In the publish-subscribe model, the subscribers receive only a subset of the total messages published. The process of selecting messages for reception and processing is called filtering. There are two common forms of filtering: topic-based and content-based. The DDS middleware does not use a broker in the middle. Instead, each publisher and subscriber in the pub/sub system shares meta-data about each other via IP multicasting. The publisher and the subscribers cache this information locally and route messages based on the discovery of each other in the shared cognizance.

The system 100, employing a datacentric approach, and the isolation of individual components adds modularity to the system. Based on the requirements of the system 100, the data types, and topics are defined in the DDS domain. The elements of the system are domain participant nodes that join or leave multiple DDS domains. These nodes can act as publishers, subscribers, or both. Each node can distinctly define information as topics. The updates of the topic instances, known as data samples, are exchanged between them. All communication between the components of the system is through the DDS middleware network. The auto-discovery mechanism of DDS middleware network allows any component to join or leave the DDS domain at any time. Therefore, integrating two or more components to coordinate and perform a particular operation is simple without the need for centralized control.

Each of the U-shaped conveyor belt 108, the first plurality of robots 107*a*, the second plurality of robots 107*b*, the plurality of UGVs (110*a*, 110*b*), the plurality of UAVs (112*a*, 112*b*) and the plurality of warehouse servers 103 are configured as one or both of a publisher of data topics and a subscriber to data topics.

Each UGV (110*a*, 110*b*) is configured to subscribe to the order topic. After receiving the subscribed order topic, the UGV (110*a*, 110*b*) is configured to listen for its UGV identifier. The UGV (110*a*, 110*b*) retrieves the package identifier from the order topic. Further, the UGV (110*a*, 110*b*) subscribes to the UGV package path topic and retrieves the transfer path. After retrieving the transfer path, the UGV (110*a*, 110*b*) is configured to move to the retrieved transfer path and retrieve (pick) the package from the shelf location. After picking the package, the UGV (110*a*, 110*b*) is configured to subscribe to the UGV to UAV path topic, and autonomously deliver the package to the UAV landing pad for the UAV closest to the shelf location. After delivering the package to the UAV landing pad 114, the UGV (110*a*, 110*b*) is configured to publish on the package status topic that the package was delivered to the UAV landing pad 114.

Each UAV (112*a*, 112*b*) is configured to subscribe to the package status topic. The UAV (112*a*, 112*b*) is configured to listen for its UAV identifier. The UAV (112*a*, 112*b*) subscribes to the package position topic. The UAV (112*a*, 112*b*) is configured to retrieve the UAV landing pad identifier and move to the identified UAV landing pad. The UAV (112*a*, 112*b*) is configured to pick up the package and publish the package identifier. The UAV (112*a*, 112*b*) is configured to update the package status on the package status topic and autonomously fly the package to the package delivery address. The UAV (112*a*, 112*b*) delivers the package and publishes to the package status topic that the package was delivered.

In an aspect, each UAV (112*a*, 112*b*) includes a navigation system (not shown in the figures). The navigation system further includes a global positioning receiver, located within the navigation system. The global positioning receiver is configured to determine the location of the UAV (112*a*, 112*b*) periodically and publish the location of the UAV to the UAV status topic.

Figure 2:
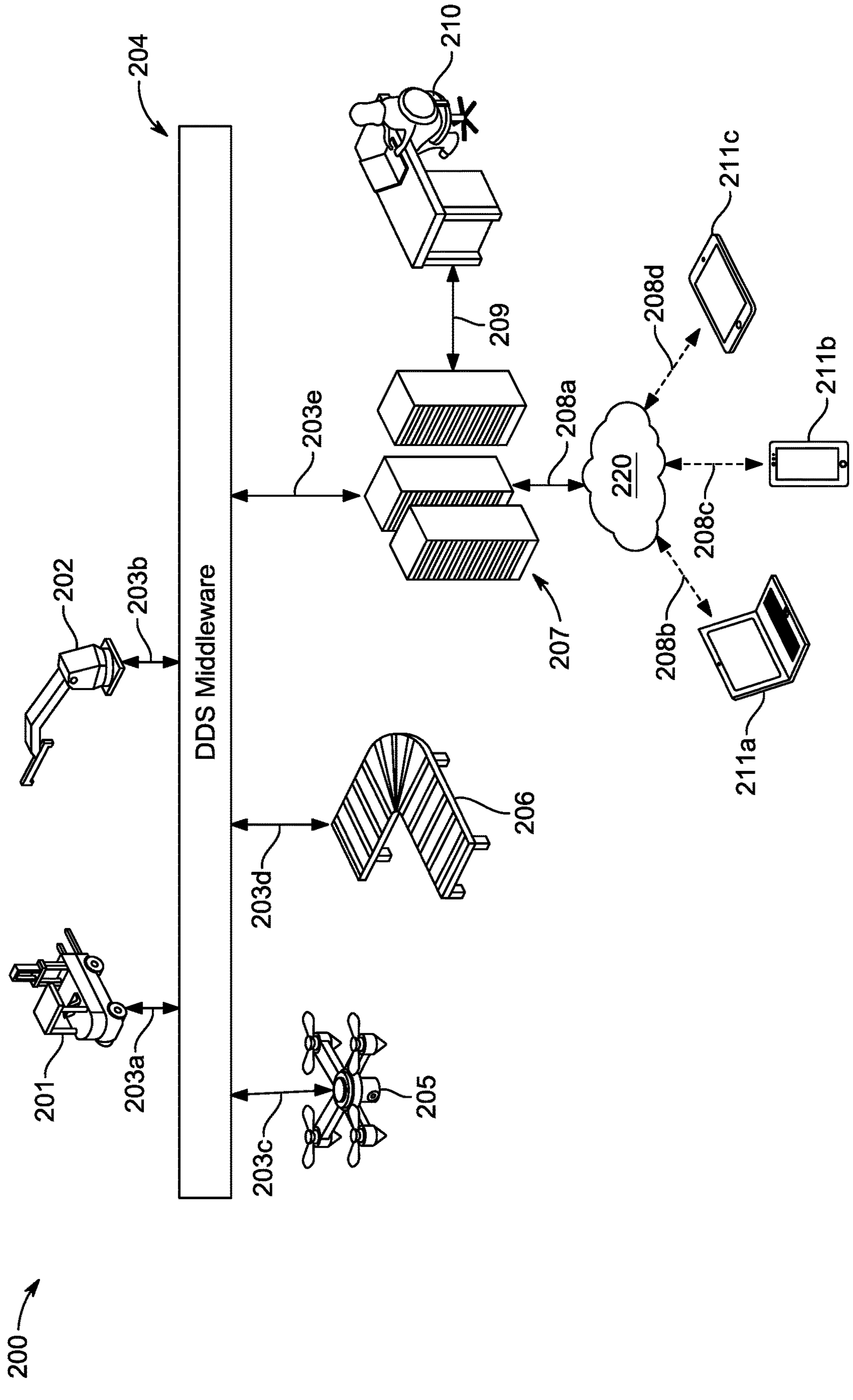
FIG. 2 illustrates an exemplary flow chart of the autonomous warehouse package delivery middleware communication system, according to certain embodiments.

The plurality of warehouse servers 103 is communicatively connected by the real-time data distribution middleware network (204) as shown in FIG. 2. The real-time data distribution middleware network is configured to use a publish/subscribe protocol.

The database 120 is operatively connected to the plurality of warehouse servers 103. The database 120 is configured to record a UGV location and an availability status of each of the UGVs (110*a*, 110*b*), a UAV location and an availability status of each of the UAVs (112*a*, 112*b*), a robot status of each of the first plurality of robots 107*a*, a robot status of each of the second plurality of robots 107*b*, a shelf location, an availability status of each package and a package identifier for each package.

The plurality of warehouse servers 103 is configured to receive a plurality of package orders. Each package order includes a package delivery address. The plurality of warehouse servers 103 is configured to save the package order along with the package delivery address in the database 120, and to publish an order topic for each of the plurality of package orders. For each package order, the plurality of warehouse servers 103 is configured to search the database 120 to determine an availability of the package of the package order. The plurality of warehouse servers 103 is configured to retrieve the shelf location and the package identifier associated with the package order. To make a pickup of the package, the plurality of warehouse servers 103 is configured to subscribe to a UGV status topic of each of the UGVs (110*a*, 110*b*). In an example, the UGV status topic includes an availability and a location of each UGV. Also, the plurality of warehouse servers 103 is configured to subscribe to a UAV status topic of each of the UAVs (112*a*, 112*b*). In an example, the UAV status topic includes an availability and a location of each UAV. The plurality of warehouse servers 103 is configured to determine, by a simulated annealing procedure, a UGV which is closest to the shelf location and available to retrieve the package and a UAV which is closest to the shelf location and available to deliver the package to the package delivery address.

The plurality of warehouse servers 103 is configured to publish a UGV identifier of the UGV closest to the shelf location to a UGV package path topic. The plurality of warehouse servers 103 is configured to publish a UAV identifier of the UAV closest to the shelf location to a UAV path topic. The plurality of warehouse servers 103 is configured to calculate a transfer path for the UGV closest to the shelf location to retrieve the package from the shelf location and deliver the package to a UAV landing pad 114 for the UAV closest to the shelf location and publish a UGV to UAV package path topic.

The system administrator computer station 104 is connected to the plurality of warehouse servers 103. The system administrator computer station 104 is configured to monitor the UGV status, monitor the UAV status, monitor the package status topic, monitor a package inventory and order supplies for the package inventory.

The UAV landing pad closest to the shelf location is one of a plurality of UAV landing pads 114 located outside of the warehouse 105. Each UAV is assigned to a UAV landing pad and is configured to taxi to the assigned UAV landing pad and pick up the package when the package is delivered to the assigned UAV landing pad by one of the UGVs (110*a*, 110*b*).

FIG. 2 illustrates an exemplary flow chart 200 of the system 100, according to certain embodiments.

In an operative aspect, the plurality of user computing stations (211*a*, 211*b*, 211*c*) may register with the system 100 or the plurality of warehouse servers 207 using a shopping application having a registration interface. The plurality of user computing stations (211*a*, 211*b*, 211*c*) are configured to place a plurality of package orders using the shopping application. In some examples, the user computing stations (211*a*, 211*b*, 211*c*) may include communication capabilities (e.g., through cellular, Bluetooth, hotspot and/or Wi-Fi) that support communication with other devices and/or the system 100. For example, and without limitation, the user computing stations (211*a*, 211*b*, 211*c*) may refer to a workstation, a mobile device, PDA, desktop computer, GPS device, automotive navigation system, wearable object, a cellular telephone, a tablet, a netbook, a wireless terminal, a laptop computer, a wearable computer device, a remote computing terminal or any other device. As shown in FIG. 2, the plurality of user computing stations (211*a*, 211*b*, 211*c*) is connected to the plurality of warehouse servers 207 over a network (internet) 220 as shown by a plurality of internet connections (208*b*, 208*c*, and 208*d*) respectively. The plurality of warehouse servers 207 is connected to the internet 220 by an internet connection 208*a*. For example, the plurality of warehouse servers 207 may be a cloud based server that is in communication of a plurality of local servers and/or computing devices that are located throughout a geographical region being serviced. A delivery vehicle of the system, including a UAV or UGV, may include a wireless communications module that is in communication with one or more of the plurality of warehouse servers 207 and/or computing devices, such as via a wireless internet or cellular connection. Therefore the components of the system can be interconnected by any form or medium of digital data communication, e.g., a communication network. Examples of communication networks include a local area network ("LAN") and a wide area network ("WAN"), e.g., the Internet. Particularly, the relationship of server and client arises by virtue of computer programs or firmware, e.g., software programs and applications, or hardware configurations, running on the respective computers and having a client-server relationship to each other.

As shown in FIG. 2, each of the U-shaped conveyor belt 206, the plurality of robots 202, the plurality of UGVs 201, the plurality of UAVs 205, and the plurality of warehouse servers 207 are connected to the real-time data distribution middleware network 204 via a plurality of intranet connections 203*d*, 203*b*, 203*a*, 203*c*, and 203*e* respectively.

As shown in FIG. 2, the plurality of warehouse servers 207 is connected to the system administrator computer station 210 via an intranet connection 209. The data distribution middleware network (DDS middleware) 204 is configured to enable the integration of various components (plurality of robots 202, the plurality of UGVs 201, the plurality of UAVs 205, and the plurality of warehouse servers 207) using a middleware protocol. In a non-limiting example, data distribution middleware network (DDS middleware) 204 is the Data Distribution Service (DDS), produced by the Object Management Group® Standards Development Organization (OMG® SDO), located in Milford, Massachusetts, United State of America, which is an international, membership-driven and not-for-profit consortium. The DDS uses a virtual global data space (GDS), where domain participant nodes communicate. These domain participant nodes in GDS may be publishers or subscribers, or both. The system 100 employs the data distribution middleware network due to its unique features of auto-discovery mechanism and Quality of Service (QOS) policies. The auto-discovery mechanism allows nodes to join or leave the system 100 at any time. The QoS policies of DDS govern the behavior of the entities within DDS and tailor it to the requirements of the system 100. The dynamic discovery of data distribution middleware network allows any application within GDS to exchange information seamlessly. The system 100 is flexible for horizontal and vertical integration without concern about complexities of the integration. The QoS policies of DDS enhance the communication behavior of the overall system, ensuring reliability.

The data distribution middleware network (DDS middleware) 204 is a network application programming interface (API) that allows a plurality of hosts to communicate in real-time. The data distribution middleware network 204 compartmentalizes communication between the host by using "topics". For each topic, there are publishers who add information to the topics, and subscribers who listen to the information.

In an operative aspect, the plurality of warehouse servers 207 receives the plurality of package orders having a package intentifier (PkID) from the plurality of user computing stations (211*a*, 211*b*, 211*c*). The PkID allows the system to access a specified package. Furthermore, the plurality of warehouse servers 207 extracts the customer's address (Cust_Addr) from the package order. The plurality of warehouse servers 207 saves the package order (PkID) with the package delivery address (Cust_Addr) in the database. The plurality of warehouse servers 207 publishes the order topic for each of the plurality of package orders. Further, for each package order, the plurality of warehouse servers 207 searches the database 120 to determine an availability of the package of the package order and retrieves the shelf location and the package identifier. The plurality of warehouse servers 207 gets the status of the UGVs 201 and UAVs 205 from the UV_Status topic of the DDS middleware 204. The plurality of warehouse servers 207 also obtains the position of the UGVs (110*a*, 110*b*) and UAVs (112*a*, 112*b*) from the UV_Position topics. The plurality of warehouse servers 207 then uses the simulated annealing procedure to find the optimal free UGV and UAV closest to the package. The plurality of warehouse servers 207 publishes the order in the Order topic of the DDS middleware 204. The plurality of warehouse servers 207 also publishes the calculated travel path for the UGV to the package to the UGV_Pkg_Path and the path of the UGV to the UAV in the UGV_UAV_Path topic. The plurality of warehouse servers 207 also publishes the UAV to the customer path to the UAV_Path topic. These topics are shown in the topics table in Table 3.1.

When a new shipment arrives in the inventory receiving area 106, the first plurality of robots 107*a* places the packages in the shipment on the U-shaped conveyor belt 108, where they are taken to different locations of the warehouse 105. The second plurality of robots 107*b* picks up the packages from the U-shaped conveyor belt 108 and places them on the plurality of shelving units (109*a* and 109*b*). Then the second plurality of robots 107*b* publishes (the PkID, its details, the shelf's ID, and its position (x,y,z) on the shelf) on the Shelf topic through the middleware shown in FIG. 2 and Table 1. In an example, the plurality of warehouse servers 207 can only subscribe to the shelf topic. The plurality of warehouse servers 207 uses the information to update the package data in the database 120 of the system 100 and to a front end of the shopping application (shopping website) where the customers make orders, for example, in order to show the number of packages of the product available on the shopping website interface.

Table 1 shows the different topics used by the DDS middleware 204 in the system 100. The "Parameters" column shows the data each piece of information published contains and the "Description" column shows describes what each piece of information represents. The "Publishers" are the entities that put information on the middleware, while the "Subscribers" column shows the listeners the topic.

TABLE 1

Topics Maintained by the DDS middleware 204

| Sn | Topic | Parameters | Description | Publishers | Subscribers |
|---|---|---|---|---|---|
| 301 | Position | x | x-axis Coordinates | UGV | UGV |
| 302 | | y | y-axis Coordinates | UAV | UAV |
| 303 | | z | z-axis Coordinates | | Server |
| 304 | | UV_ID | UGV/UAV Identifier | | |
| 305 | | PKID | Package Identifier | | |
| 306 | Package Status | Status_Code | 110-Package Available | UGV UAV | UGV UAV |
| 307 | | | 111-Package Picked | | Server |
| 308 | | | 112-Package Dropped | | |
| 309 | | | 113-Package Missing | | |
| 310 | | | 114-Package Damaged | | |
| 311 | UV_Status | Status_Code | 210-UGV Parked | UGV | UGV |
| 312 | | | 211-UGV Going to Package | UAV | UAV Server |
| 313 | | | 212-UGV Delivering Package | | |
| 314 | | | 213-UGV Returning Home | | |
| 315 | | | 214-UGV Out of Order | | |
| 316 | | | 220-UAV Parked | | |
| 317 | | | 221-UAV Going to Package | | |
| 318 | | | 222-UAV Delivering Package | | |

TABLE 1-continued

| Topics Maintained by the DDS middleware 204 | | | | | |
|---|---|---|---|---|---|
| Sn | Topic | Parameters | Description | Publishers | Subscribers |
| 319 | | | 223-UAV Returning Home | | |
| 320 | | | 224-UAV Out of Order | | |
| 321 | Package Position | X | x-axis Coordinates | UGV | UGV |
| 322 | | Y | y-axis Coordinates | UAV | UAV |
| 323 | | Z | z-axis Coordinates | Server | Robot |
| 324 | | PkID | Package Identifier | Robot | Server |
| 325 | Shelves | X | x-axis Coordinates | Robot | UGV |
| 326 | | Y | y-axis Coordinates | | UAV |
| 327 | | Z | z-axis Coordinates | | Server |
| 328 | | Shelf_ID | Shelf Identifier | | |
| 329 | | PkID | Package Identifier | | |
| 330 | | Type | Package Type | | |
| 331 | | Name | Package Name | | |
| 332 | Order | UGV_ID | UGV Identifier | Server | UGV |
| 333 | | UAV_ID | UAV Identifier | | UAV |
| 334 | | PKID | Package Identifier | | Server |
| 335 | | Cust Addr | Customer Address | | |
| 336 | UGV_Pkg_Path | UGV_ID | UGV Identifier | Server | UGV |
| 337 | | Pkg_Path[ ] | Path from UGV to Package | | |
| 338 | UGV_UAV_Path | UGV_ID | UGV Identifier | Server | UGV |
| 339 | | UAV_Path[ ] | Path from UGV to UAV | | |
| 340 | UAV_Path | UAV_ID | UAV Identifier | Server | UAV |
| 341 | | Path[ ] | Path from UAV to Customer | | |

Figure 3:
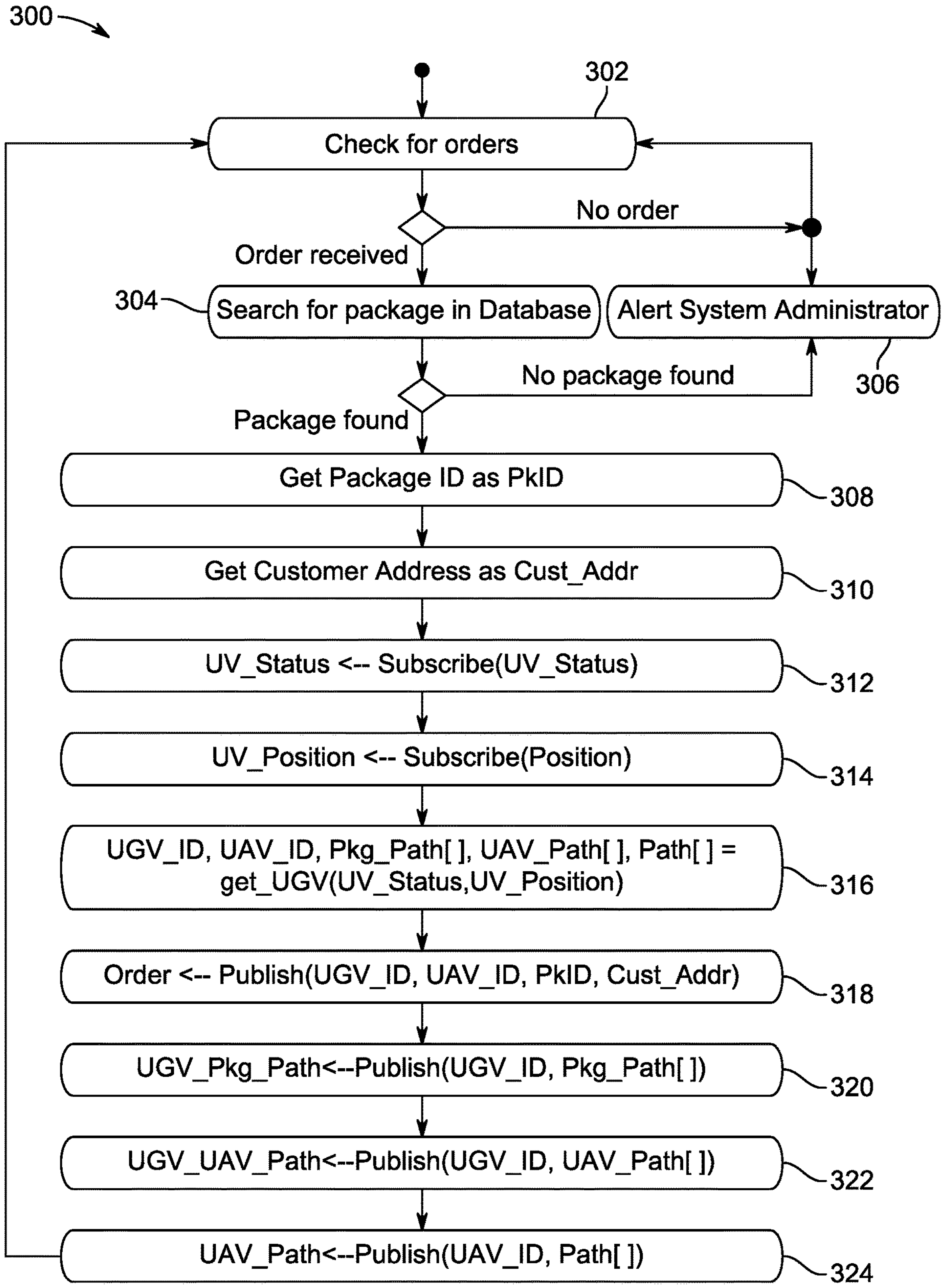
FIG. 3 illustrates a process flow for receiving orders by a plurality of warehouse servers, according to certain embodiments.

FIG. 3 illustrates a process flow (300) for receiving orders by the plurality of warehouse servers 103 through the internet 101, according to certain embodiments.

During step 302, the plurality of warehouse servers 103 is configured to check the plurality of package orders. In an example, each package order includes at least one package detail such as a package id number, and a package delivery address. If no new order has been received, the plurality of warehouse servers 103 is configured to wait for a predefined time and, after the predefined time, actively look for the arrival of new orders.

During step 304, if the plurality of warehouse servers 103 has received a new order, then the plurality of warehouse servers 103 searches for the at least one package detail in the database 120 to determine an availability of the package of the package order. The plurality of warehouse servers 103 is configured to save the package order with the package delivery address in the database 120. The plurality of warehouse servers 103 publishes an order topic for each of the plurality of package orders.

If no package order detail is found in the database 120, an alert is sent to the system administrator computer station 104 (as shown by 306). If the package order detail is found in the database 120, then during step 308, the plurality of warehouse servers 103 is configured to receive a package ID (as PkID) from the database 120.

During step 310, the plurality of warehouse servers 103 is configured to receive a customer address (as Cust_Addr) from the database 120.

During step 312, the plurality of warehouse servers 103 is configured to subscribe to a UAV status (UV_status) topic of each of the UAVs (112*a*, 112*b*). The UAV status topic includes an availability and a location of each UAV. The plurality of warehouse servers 103 is configured to store the subscribed UV status in the database 120.

During step 314, the plurality of warehouse servers 103 is configured to subscribe to a UAV position (UV_position) topic of each of the UAVs (112*a*, 112*b*).

During step 316, the plurality of warehouse servers 103 is configured to subscribe to a UGV status topic of each of the UGVs (110*a*, 110*b*). The UGV status topic includes an availability and a location of each UGV. Further, the plurality of warehouse servers 103 is configured to get the UGV based upon the UV_Status, and the UV_Position. The plurality of warehouse servers 103 is configured to determine, by the simulated annealing procedure, a UGV which is closest to the shelf location and available to retrieve the package and a UAV which is closest to the shelf location and available to deliver the package to the package delivery address.

During step 318, the plurality of warehouse servers 103 is configured to publish a UGV identifier (UGV_ID) of the UGV closest to the shelf location to a UGV package path topic. The plurality of warehouse servers 103 is configured to publish a UAV identifier (UAV_ID) of the UAV closest to the shelf location to a UAV path topic. The plurality of warehouse servers 103 is configured to publish the packet ID (PkID), and current address (Cust_Addr). In an example, the plurality of warehouse servers 103 is configured to publish UAV_ID, UGV_ID, PKID, and Cust_Addr associated with the order.

During step 320, the plurality of warehouse servers 103 is configured to calculate a transfer path (UGV_Pkg_path [ ]) for the UGV closest to the shelf location to retrieve the package from the shelf location and deliver the package to a UAV landing pad for the UAV closest to the shelf location.

During step 322, the plurality of warehouse servers 103 is configured to publish a UGV to UAV package path topic (UGV_UAV_Path) based on the UGV_ID, and UAV_Path [ ]).

During step 324, the plurality of warehouse servers 103 is configured to publish the UAV_Path.

Figure 4:
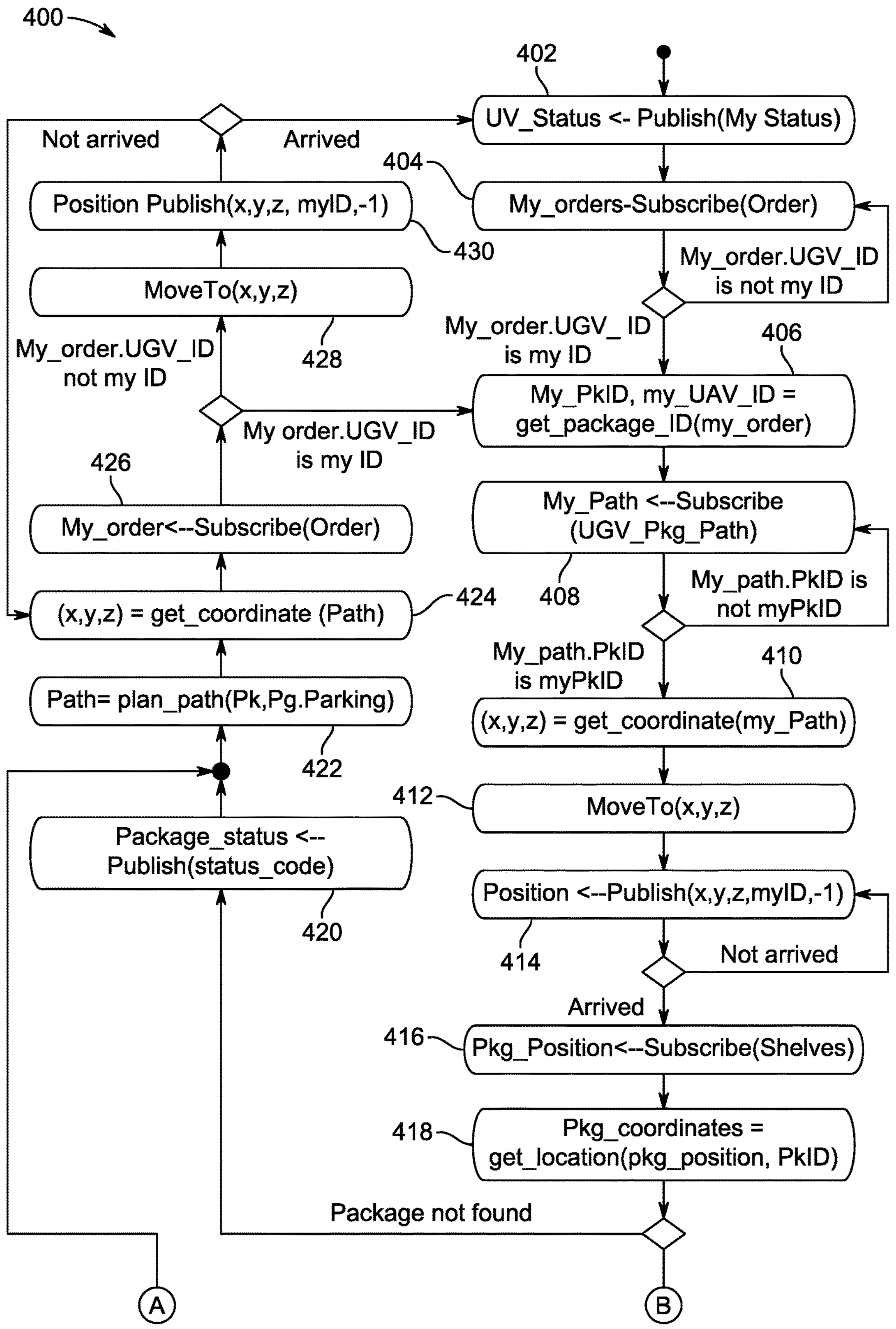
FIG. 4 illustrates a process flow for dropping off a package by an unmanned ground vehicle (UGV), according to certain embodiments.
Figure 4:
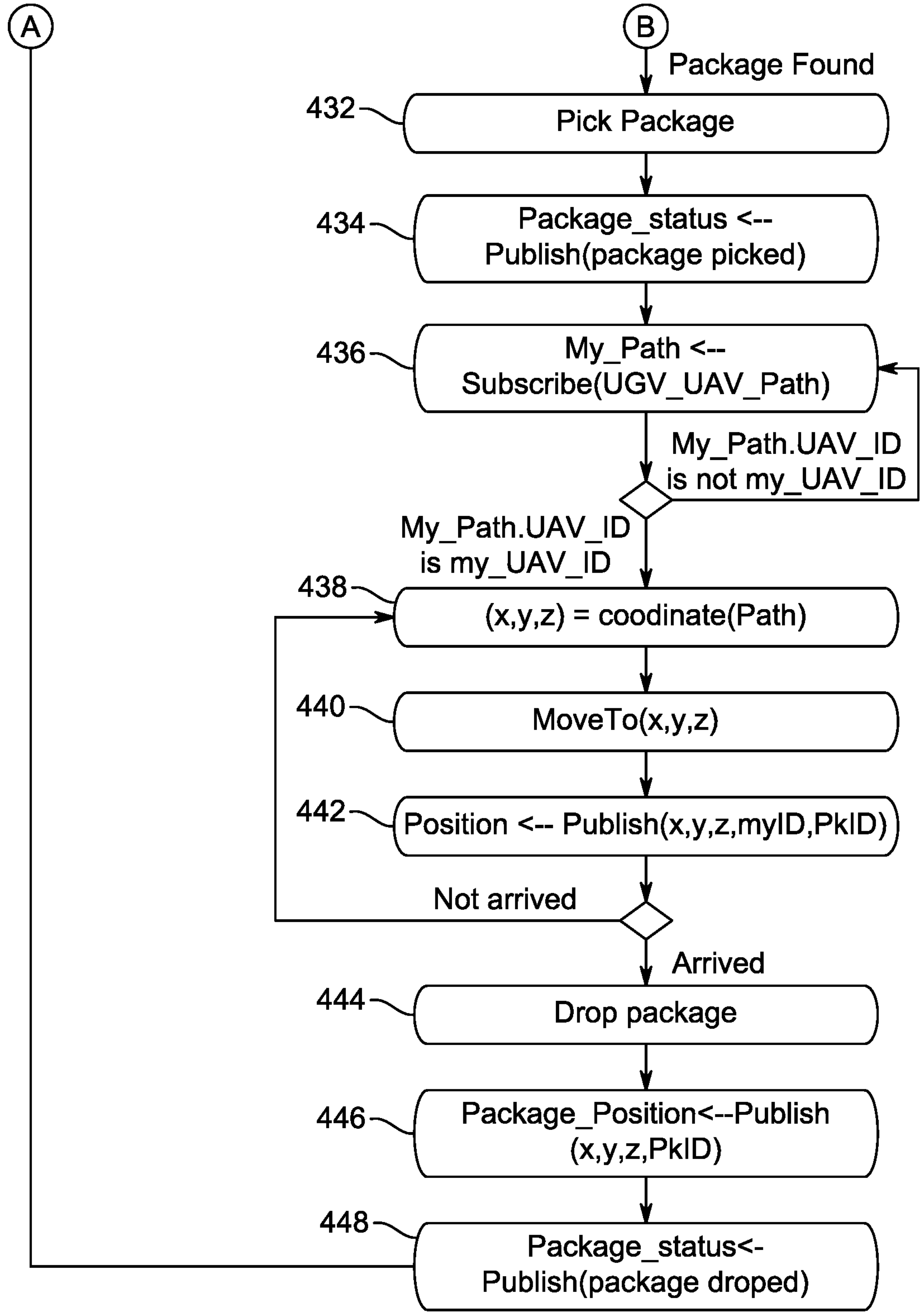

FIG. 4 illustrates a process flow 400 for dropping off the order by the UGV (110*a*, 110*b*). During step 402, the plurality of warehouse servers 103 is configured to publish the status of the UGVs (110*a*, 110*b*) and UAVs (112*a*, 112*b*) from the UV_Status topic of the DDS middleware 104. As shown in step 404, the UGV is configured to subscribe to the order topic. The UGV is listening for its UGV identifier (UGV_ID). Further, the UGV is configured to check whether the UGV_ID is my ID or not. If the UGV_ID is not assigned with the UGV, then the UGV is configured to subscribe to another order topic. The UGV is configured to retrieve the package identifier from the order topic (during step 406). As shown in step 408, the UGV is configured to subscribe to the UGV package path topic (my_path.PkID). Further, the UGV is configured to check whether the my_path.PkID is my PkID or not. When the subscribed UGV package path topic (my_path.PkID) is the PkID of the UGV, then the UGV is configured to retrieve the coordinates of the my_path (as shown by step 410). In step 412, the received coordinates are analyzed to determine the path of the UGV must follow to pick up a package from a shelving unit.

During step 414, the UGV (110*a*, 110*b*) is configured to calculate the position of the UGV, by publishing the coordinates of the UGV, myID. The UGV (110*a*, 110*b*) is configured to calculate whether the package has been arrived at the order location or not. When the UGV (110*a*, 110*b*) arrives to the order location (package location), then the UGV (110*a*, 110*b*) retrieves the package from the shelf location (as shown in step 416). During step 418, the UGV (110*a*, 110*b*) is configured to get packet coordinates by using pkg_position and PkID. The UGV (110*a*, 110*b*) is configured to check the packet coordinates and whether the packet was found at the shelf location or not found at the shelf location.

If the packet was not found at the designated shelf location, then the UGV (110*a*, 110*b*) is configured to publish the package status_code (step 420). During step 422, the UGV (110*a*, 110*b*) is configured to retrieve the planned path by using Pk, Pg, and parking details. The UGC (110*a*, 110*b*) is configured to receive an array of x, y, and z coordinates of the path (as shown in step 424). The UGV (110*a*, 110*b*) is configured to subscribe to orders (step 426). As shown in step 428, after receiving the subscribed order, the UGV (110*a*, 110*b*) is configured to store the subscribed order and check whether the my_order. UGV_ID is my ID or not. If the my_order. UGV_ID is not my_ID, then the UGV (110*a*, 110*b*) moves to receive the array of x, y, and z coordinates of the path. After moving to the received coordinates of the path, the UGV (110*a*, 110*b*) is configured to publish its position (as shown in step 430).

If the packet is found at the designated location of the shelf, then the UGV (110*a*, 110*b*) is configured to pick up the package (step 432). After picking up the package, the UGV (110*a*, 110*b*) is configured to publish a message saying that "package picked" (step 434). During step 436, the UGV (110*a*, 110*b*) is configured to subscribe to the UGV to UAV path topic (UGV_UAV_Path). The UGV (110*a*, 110*b*) is further configured to determine whether my_Path.UAV_Id is my_UAV_ID or not. If my_Path.UAV_Id is my_UAV_ID, then the UGV (110*a*, 110*b*) is configured to retrieve the array of x, y, and z coordinates of the path (step 438). Then the UGV (110*a*, 110*b*) analyzes the retrieved coordinates (step 440).

During step 442, the UGV (110*a*, 110*b*) is configured to publish the position by using the array of x, y, and z coordinates, myID, and PkID. The UGV (110*a*, 110*b*) is configured to determine whether it has arrived at end coordinates of the path or not. If the UGV (110*a*, 110*b*) has arrived at the end coordinates, then the UGV (110*a*, 110*b*) is configured to deliver the package to the UAV landing pad for the UAV (112*a*, 112*b*) closest to the shelf location (during step 444). During step 446, the UGV (110*a*, 110*b*) is configured to publish the coordinates along with the PkID. In step 448, the UGV (110*a*, 110*b*) is configured to publish on the package status topic that the package was delivered to the UAV landing pad 114.

In an exemplary aspect, when the UGV (110*a*, 110*b*) finds a message with its identifier 330 (see Table 1), the UGV (110*a*, 110*b*) records the package identifier PkID 332 and the UAV identifier UAV_ID 331 of the drone (UAV) that will deliver the package to the customer at address Cust_Addr 334. The UGV (110*a*, 110*b*) uses the PkID to retrieve the path to the package from the UGV_UAV_Path topic, which contains an array of x, y, and z coordinates that leads to the package. The UGV (110*a*, 110*b*) moves from parking area to the shelf containing the package by taking each element of the array in my_path.

Figure 5:
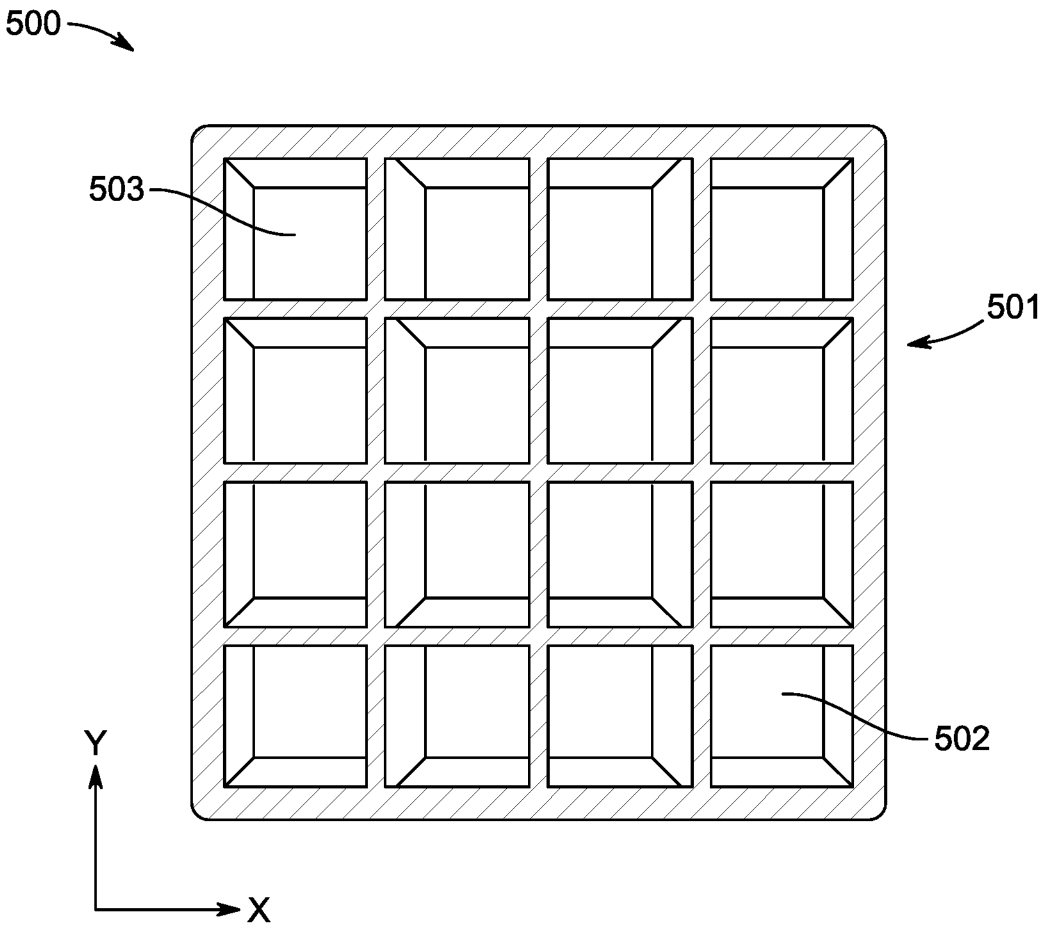
FIG. 5 illustrates an exemplary arrangement of the shelves in a shelving unit, according to certain embodiments.

When the UGV (110*a*, 110*b*) reaches the shelf it checks the Shelves topic for the position of the package on shelf 501 (refer in FIG. 5. The UGV fetches the packages from the shelf using the cartesian coordinates x, y, and z. If the package is available the UGV (110*a*, 110*b*) picks it, otherwise, the UGV (110*a*, 110*b*) publishes that the package is not found. Alternatively, the UGV (110*a*, 110*b*) may stop at a designated area and the second plurality of robots 107*b* (shelving robot) may load the UGV (110*a*, 110*b*) with the package. Thus, when the package is not available then the second plurality of robots 107*b* publishes the package's status, and the UGV (110*a*, 110*b*) returns to the parking area.

Once the UGV (110*a*, 110*b*) picks up the package, it publishes on the Package_status topic of the DDS middleware 204 that it has the package. Then, the UGV (110*a*, 110*b*) fetches the path to the nearest UAV. The UGV (110*a*, 110*b*) travels to the drop-off area (package pick up area 114) for the designated UAV while publishing its position on the position topic periodically. However, the UGV (110*a*, 110*b*) adds the PkID of the package along with its publication. When the UGV (110*a*, 110*b*) is moving without a package, the value of the PkID=−1. Thus, the PKID in the Position topic and the UV_Status topic allow the subscribers to know what the UGV is up to. Once, the UGV arrives at the drop-off area 113, it publishes on the Package_status topic that the package is dropped for the UAV to pick up. The UAV (112*a*, 112*b*) notices a package is dropped after the package's position is published on the Package_Position. Then, the UGV plans (110*a*, 110*b*) a route to return to its parking area.

The UGV (110*a*, 110*b*) publishes its position as it drives back to its parking area. It also checks the Order topic for a possible new order from the plurality of warehouse servers 103. If the order is meant for the UGV (110*a*, 110*b*), it aborts its travel home and gets the optimized path to the package, gets the package, and drops it for the planned UAV. Otherwise, the UGV (110*a*, 110*b*) continues towards its parking area. On reaching the parking area the UGV (110*a*, 110*b*) docks and publishes in the UV_Status topic that it is parked.

FIG. 5 illustrates an exemplary arrangements 500 of the shelves in the shelving unit 501. The shelving unit 501 includes an array of shelves (502, 503). Each shelf is configured to hold one package. In an example, when the UGV reaches near the shelf based upon the package position topic. The package position topic includes the package identifier and the shelf location to a package position topic. The UGV (110*a*, 110*b*) checks the Shelves topic for the position of the package on the shelving unit 501. The UGV (110*a*, 110*b*) fetches the packers from the shelf using the cartesian coordinates x, y, and z. The UGV (110*a*, 110*b*) considers a bottom-left corner of the shelving unit 501 as the origin. The self (502) is addressed (0, 3) where the first digit is the x-coordinate and the second is the y-coordinate. Thus, the self (503) is located at (3, 0). If the package is available, the UGV picks it up, otherwise, the UGV (110*a*, 110*b*) publishes that the package is not found.

Each UGV is equipped with forklift blades which can be raised or lowered by the UGV to reach the package location on the shelf. Once the blades reach the shelf location, the UGV moves close to the stack of shelves to push the blades beneath the package and lift it from the shelf. Then the UGV reverses until the package is clear of the shelf, at which point the UGV lowers the blades to a travelling position. Once the UGV arrives at the UAV pick up location, the UGV lowers the blades to a ground position and reverses to release the package to the UAV landing pad 114. The UAV landing pad is equipped with four arms which are configured to hold the package in place as it is released by the UGV. The landing pad may include a shaped landing area for the landing gear of the UAV to orient upon as it lowers to pick up the package. The shaped landing area is equipped with springs to reduce the force on the UAV landing gear as the UAV lowers itself to the landing pad. The UAV may include grasping arms which extend to grasp and raise the package into the bay of the UAV. The same grasping arms or another set of grasping arms moves the package into a storage location in the bay. Each set of grasping arms may be equipped with a retractable "hand" which can be extended at a ninety degree angle from the end of the grasping arm in order to provide support as the package is being lifted. The grasping arms may include rubber surfaces to protect the packages from crushing and to provide a non-slip surface.

Each UAV is configured to provide an audible "beeping" sound when it reverses in order to alert human personnel to its reverse movement.

Figure 6:
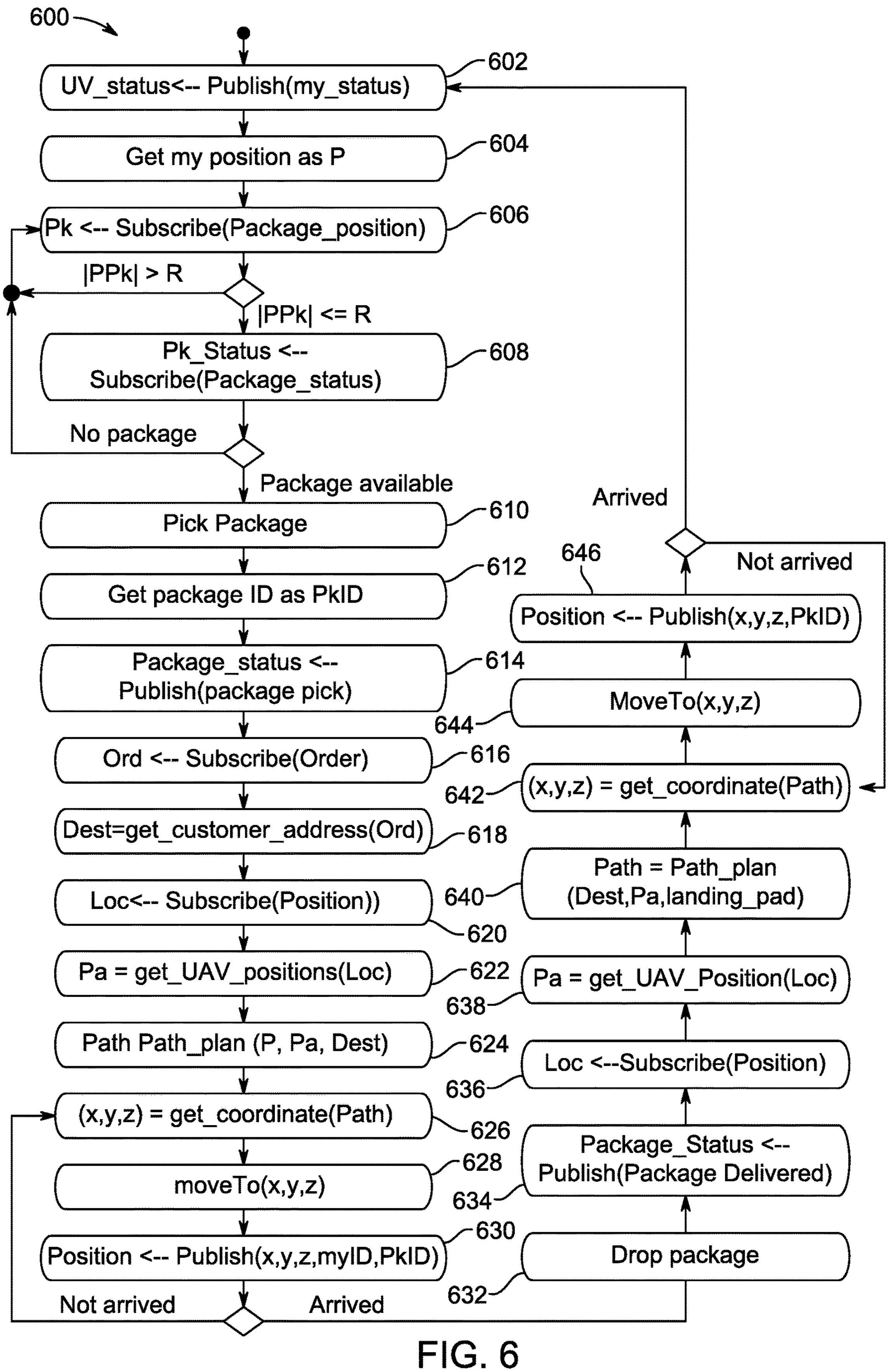
FIG. 6 illustrates a process flow for delivering the package by an unmanned aerial vehicle (UAV), according to certain embodiments.

FIG. 6 illustrates a process flow 600 for delivering the package by the UAV (112*a*, 112*b*). Step 602, the UAV (112*a*, 112*b*) is configured to publish a status (UV_Status) topic. In an example, the UV_Status includes various states of the UAV such as parked, going to package, delivering package, returning home and out of order. The plurality of warehouse servers 103 is configured to receive the status of the UAV (112*a*, 112*b*) and store the received location as P (step 604). During step 606, each UAV (112*a*, 112*b*) is configured to subscribe to the package position topic. During step 608, each UAV (112*a*, 112*b*) is configured to subscribe to the package status topic. The UAV (112*a*, 112*b*) is configured to check whether the package is available or not. If the packet is available, the UAV (112*a*, 112*b*) is configured to pick the package (step 610). During step 612, each UAV (112*a*, 112*b*) is configured to get the package ID (PkId). The UAV (112*a*, 112*b*) is configured to publish the message stating "package pick" (step 614). During step 616, the UAV (112*a*, 112*b*) is configured to subscribe to order topic. In step 618, the UAV (112*a*, 112*b*) is configured to get the customer location (package delivery address) from the subscribed order. The UAV (112*a*, 112*b*) is configured to subscribe to position topic (step 620). The UAV (112*a*, 112*b*) is configured to get positions of the UAV positions (step 622). The UAV (112*a*, 112*b*) is configured to determine the path based upon the received positions, and destination (step 624). In step 626, the UAV (112*a*, 112*b*) is configured to determine coordinates based on the determined path. Step 628 includes autonomously flying the package to of the UAV (112*a*, 112*b*) to the determined coordinates. After reaching to the coordinates, the UAV (112*a*, 112*b*) is configured to publish its position based on the coordinates along with myID, and PkID (step 630). Once the UAV (112*a*, 112*b*) arrived at the determined coordinates, the UAV (112*a*, 112*b*) checks whether the current coordinate of the UAV is matching with the package delivery address. If the UAV (112*a*, 112*b*) arrived at the package delivery address, then the UAV delivers the package (step 634). In step 636, the UAV (112*a*, 112*b*) publishes to the package status topic that the package was delivered. Further, the UAV (112*a*, 112*b*) is configured to get a current position (step 638). The UAV (112*a*, 112*b*) is configured to determine a path plan based upon address of destination, current position of the UGV, and location of the landing pads 114 (step 640). The UAV (112*a*, 112*b*) is configured to retrieve the coordinates of the determined travel path (step 642). In step 644, the UAV (112*a*, 112*b*) is configured to move to the retrieved coordinates. In step 646, the UAV is configured to publish its updated position.

In an exemplary aspect, when the UAV (112*a*, 112*b*) publishes its status to allow the plurality of warehouse servers 103 to choose an optimal UAV to deliver a certain package. If the package is dropped within the UAV's drop-off area (i.e., |P Pk|), the UAV (112*a*, 112*b*) picks the package. The UAV also gets the PkID to publish that the UAV (112*a*, 112*b*) has picked the package on the Package_Status. The UAV (112*a*, 112*b*) then gets the position of other UAVs (112*a*, 112*b*) through the Position topic and then plans a path to the customer's address. On arrival, the UAV (112*a*, 112*b*) drops the package and publishes that the package is delivered on the Package_status topic. It then plans its path back to the landing pad at the warehouse. The UAV (112*a*, 112*b*) publishes its location periodically as it travels. The UAV (112*a*, 112*b*) allows other UAVs (112*a*, 112*b*) and the server 103 to know their location. The UAV (112*a*, 112*b*) also helps the UAVs avoid collisions, and it helps the server plan order servicing. Once the UAV (112*a*, 112*b*) lands at the warehouse 105, it publishes its status in the UV_Status topic.

In a summary aspect, the system 100 has the following features:

1. Uses robots to manage storage, UGVs to transport the package to a UAV-pickup area, and a UAV to doorstep delivery.
2. Uses path planning to minimize the distance traveled by the UAVs, and the UGVs, which reduces energy consumption and environmental impact.
3. Reduces the number of workers in the warehouse, thereby saving money, and reducing accidents.
4. Reduces delivery time by reducing the time it takes to locate the item in the warehouse, and the time to deliver it to the customer.
5. Reduces the downtime of the warehouse because the system operates autonomously.

The first embodiment is illustrated with respect to FIG. 1-FIG. 6. The first embodiment describes the autonomous warehouse package delivery communication system 100. The autonomous warehouse package delivery communication system 100 includes a U-shaped conveyor belt 108, a first plurality of robots 107*a*, a second plurality of robots 107*b*, a plurality of unmanned ground vehicles (UGVs) (110*a*, 110*b*), a plurality of unmanned aerial vehicles (UAVs) (112*a*, 112*b*), and a plurality of warehouse servers 103 communicatively connected by a real-time data distribution middleware network. The real-time data distribution middleware network is configured to use a publish/subscribe protocol. A database 120 is operatively connected to the plurality of warehouse servers 103. The database 120 is configured to record a UGV location and an availability status of each of the UGVs (110$a$, 110$b$), a UAV location and an availability status of each of the UAVs (112$a$, 112$b$), a robot status of each of the first plurality of robots 107$a$, a robot status of each of the second plurality of robots 107$b$, a shelf location, an availability status of each package and a package identifier for each package. The plurality of warehouse servers 103 are configured to receive a plurality of package orders each including a package delivery address, save the package order with the package delivery address in the database 120, and publish an order topic for each of the plurality of package orders. For each package order, the plurality of warehouse servers 103 are configured to search the database 120 to determine an availability of the package of the package order, retrieve the shelf location and the package identifier, subscribe to a UGV status topic of each of the UGVs (110$a$, 110$b$), wherein the UGV status topic includes an availability and a location of each UGV, subscribe to a UAV status topic of each of the UAVs (112$a$, 112$b$), wherein the UAV status topic includes an availability and a location of each UAV, determine, by a simulated annealing procedure, a UGV which is closest to the shelf location and available to retrieve the package and a UAV which is closest to the shelf location and available to deliver the package to the package delivery address, publish a UGV identifier of the UGV closest to the shelf location to a UGV package path topic, publish a UAV identifier of the UAV closest to the shelf location to a UAV path topic, and calculate a transfer path for the UGV closest to the shelf location to retrieve the package from the shelf location and deliver the package to a UAV landing pad for the UAV closest to the shelf location, and publish a UGV to UAV package path topic. Each UGV is configured to subscribe to the order topic, listen for its UGV identifier, retrieve the package identifier from the order topic, subscribe to the UGV package path topic, retrieve the transfer path, retrieve the package from the shelf location, subscribe to the UGV to UAV path topic, autonomously deliver the package to the UAV landing pad for the UAV closest to the shelf location, and publish on the package status topic that the package was delivered to the UAV landing pad. Each UAV is configured to subscribe to the package status topic, listen for its UAV identifier, subscribe to the package position topic, move to the UAV landing pad, pick up the package, publish the package identifier and update the package status on the package status topic and autonomously fly the package to the package delivery address, deliver the package and publish to the package status topic that the package was delivered.

In an aspect, each of the U-shaped conveyor belt 108, the first plurality of robots 107$a$, the second plurality of robots 107$b$, the plurality of UGVs (110$a$, 110$b$), the plurality of UAVs (112$a$, 112$b$) and the plurality of warehouse servers 103 are configured as one or both of a publisher of data topics and a subscriber to data topics.

In an aspect, the autonomous warehouse package delivery communication system 100 further includes a system administrator computer station 104 connected to the plurality of warehouse servers 103. The system administrator computer station 104 is configured to monitor the UGV status, monitor the UAV status, monitor the package status topic, monitor a package inventory and order supplies of the package inventory.

In an aspect, the autonomous warehouse package delivery communication system 100 further includes a warehouse 105 including the U-shaped conveyor belt 108, the first plurality of robots 107$a$, the second plurality of robots 107$b$ and an inventory receiving area configured with package stacks which store the package inventory. Each robot of the first plurality of robots 107$a$ is located between a package stack and the U-shaped conveyor belt 108, wherein each robot of the first plurality of robots 107$a$ is configured to remove a package from the package stack and place the package on the U-shaped conveyor belt 108.

In an aspect, the autonomous warehouse package delivery communication system 100 further includes a plurality of shelving units (109$a$, 109$b$) located in the warehouse. Each shelving unit includes an array of shelves. Each shelf is configured to hold one package. Each robot of the second plurality of robots 107$b$ is located at an assigned workstation between a respective shelving unit and the U-shaped conveyor belt 108, wherein each of the second plurality of robots 107$b$ is configured to remove each package from the U-shaped conveyor belt 108 as it arrives in front of the assigned workstation, place the package on one of the shelves of the respective shelving unit and publish a package position topic including the package identifier and the shelf location to a package position topic.

In an aspect, the UAV landing pad closest to the shelf location is one of a plurality of UAV landing pads 114 located outside of the warehouse 105. Each UAV is assigned to a UAV landing pad and is configured to taxi to the assigned UAV landing pad and pick up the package when the package is delivered to the assigned UAV landing pad by one of the UGVs (110$a$, 110$b$).

In an aspect, the autonomous warehouse package delivery communication system 100 further includes an intranet configured to connect each of the U-shaped conveyor belt 108, the first plurality of robots 107$a$, the second plurality of robots 107$b$, the plurality of unmanned ground vehicles (UGVs) (110$a$, 110$b$), the plurality of unmanned aerial vehicles (UAVs) (112$a$, 112$b$), and the plurality of warehouse servers 103 to the real-time data distribution middleware network.

In an aspect, the autonomous warehouse package delivery communication system 100 further includes a global positioning receiver located within a navigation system of each UAV. The global positioning receiver is configured to determine the location of the UAV periodically and publish the location of the UAV to the UAV status topic.

The second embodiment is illustrated with respect to FIG. 1-FIG. 6. The second embodiment describes an autonomous warehouse package delivery system. The system includes a warehouse 105, a plurality of unmanned ground vehicles (UGV), a plurality of unmanned aerial vehicle (UAV) landing pads 114 located outside of the warehouse 105, a plurality of warehouse servers 103 and a real-time data distribution middleware network 204. The warehouse includes a U-shaped conveyor belt 108, a plurality of shelving units (109$a$, 109$b$) configured to store packages, a plurality of package stacks, a first plurality of robots 107$a$, and a second plurality of robots 107$b$. Each UGV is configured to autonomously pick up a package from the shelf, navigate to one of the UAV landing pads 114, and place the package on the UAV landing pad. The plurality of UAVs (112$a$, 112$b$) is configured to travel to the UAV landing pad and pick up a package from the UAV landing pad, autonomously fly to a package delivery address and release the package at the package delivery address. The real-time data distribution middleware network is connected to the U-shaped conveyor belt 108, the first plurality of robots 107$a$, the second plurality of robots 107$b$, the plurality of UGVs (110$a$, 110$b$), the plurality of UAVs (112$a$, 112$b$) and the plurality of servers. The real-time data distribution middleware network is configured to use a publish/subscribe protocol to facilitate direct communication among the U-shaped conveyor belt 108, the first plurality of robots 107*a*, the second plurality of robots 107*b*, the plurality of UGVs (110*a*, 110*b*), the plurality of UAVs (112*a*, 112*b*) and the plurality of servers.

In an aspect, each of the U-shaped conveyor belt 108, the first plurality of robots 107*a*, the second plurality of robots 107*b*, the plurality of UGVs (110*a*, 110*b*), the plurality of UAVs (112*a*, 112*b*) and the plurality of warehouse servers 103 are configured as one or both of a publisher of data topics and a subscriber to data topics.

In an aspect, the autonomous warehouse package delivery system further includes a system administrator computer station 104 connected to the plurality of warehouse servers 103. The system administrator computer station 104 is configured to monitor a UGV status topic, monitor a UAV status topic, monitor a package status topic, monitor a package inventory and order supplies of the package inventory.

In an aspect, each robot of the first plurality of robots 107*a* is located between a respective package stack and the U-shaped conveyor belt 108. Each robot of the first plurality of robots 107*a* is configured to remove a package from a respective package stack and place the package on the U-shaped conveyor belt 108. Each robot of the second plurality of robots 107*b* is located between a respective shelving unit and an assigned workstation in front of the U-shaped conveyor belt 108. Each of the second plurality of robots 107*b* is configured to remove each package from the U-shaped conveyor belt 108 as it arrives in front of the assigned workstation and place the package on a shelf of the respective shelving unit.

In an aspect, the autonomous warehouse package delivery system further includes a database 120 operatively connected to the plurality of warehouse servers 103. The database 120 is configured to record a UGV location and an availability status of each of the UGVs (110*a*, 110*b*), a UAV location and an availability status of each of the UAVs (112*a*, 112*b*), a robot status of each of the first plurality of robots 107*a*, a robot status of each of the second plurality of robots 107*b*, a shelf location, an availability status of each package and a package identifier for each package.

In an aspect, the plurality of warehouse servers 103 are configured to receive a plurality of package orders each including a package delivery address, save the package order with the package delivery address in the database 120, and publish an order topic for each of the plurality of package orders.

In an aspect, for each package order, the plurality of warehouse servers 103 are further configured to search the database 120 to determine an availability of the package of the package order, retrieve the shelf location and the package identifier, subscribe to a UGV status topic of each of the UGVs (110*a*, 110*b*), wherein the UGV status topic includes an availability and a location of each UGV, subscribe to a UAV status topic of each of the UAVs (112*a*, 112*b*), wherein the UAV status topic includes an availability and a location of each UAV, determine, by a simulated annealing procedure, a UGV which is closest to the shelf location and available to retrieve the package and a UAV which is closest to the shelf location and available to deliver the package to the package delivery address, publish a UGV identifier of the UGV closest to the shelf location to a UGV package path topic, publish a UAV identifier of the UAV closest to the shelf location to a UAV path topic, calculate a transfer path for the UGV closest to the shelf location to retrieve the package from the shelf location and deliver the package to the UAV landing pad for the UAV closest to the shelf location, and publish a UGV to UAV package path topic. Each UGV is configured to subscribe to the order topic, listen for its UGV identifier, retrieve the package identifier from the order topic, subscribe to the UGV package path topic, retrieve the transfer path, retrieve the package from the shelf location, subscribe to the UGV to UAV path topic, autonomously deliver the package to the UAV landing pad for the UAV closest to the shelf location, and publish on the package status topic that the package was delivered to the UAV landing pad. Each UAV is configured to subscribe to the package status topic, listen for its UAV identifier, subscribe to the package position topic, taxi to the UAV landing pad, pick up the package, publish the package identifier and update the package status on the package status topic and autonomously fly the package to the package delivery address, deliver the package and publish to the package status topic that the package was delivered.

In an aspect, the UAV landing pad closest to the shelf location is one of a plurality of UAV landing pads 114 located outside of the warehouse. Each UAV is assigned to a UAV landing pad and is configured to taxi to its landing pad and pick up the package when the package when the package is delivered to the UAV landing pad by one of the UGVs (110*a*, 110*b*).

In an aspect, the autonomous warehouse package delivery system further includes an intranet configured to connect each of the U-shaped conveyor belt 108, the first plurality of robots 107*a*, the second plurality of robots 107*b*, the plurality of UGVs (110*a*, 110*b*), the plurality of UAVs (112*a*, 112*b*), and the plurality of warehouse servers 103 to the real-time data distribution middleware network.

In an aspect, the autonomous warehouse package delivery system further includes a global positioning receiver located within a navigation system of each UAV. The global positioning receiver is configured to determine the location of the UAV periodically and publish the location of the UAV to a UAV status topic.

The third embodiment is illustrated with respect to FIG. 1-FIG. 6. The third embodiment describes an autonomous warehouse package delivery communication method. The method includes connecting a real-time data distribution middleware network to a U-shaped conveyor belt 108, a first plurality of robots 107*a*, a second plurality of robots 107*b*, a plurality of unmanned ground vehicles (UGVs) (110*a*, 110*b*), a plurality of unmanned aerial vehicles (UAVs) (112*a*, 112*b*), and a plurality of warehouse servers 103. The method includes using, by the real-time data distribution middleware network, a publish/subscribe protocol to facilitate communication among the first plurality of robots 107*a*, the second plurality of robots 107*b*, the plurality of unmanned ground vehicles (UGVs) (110*a*, 110*b*), the plurality of unmanned aerial vehicles (UAVs) (112*a*, 112*b*), and the plurality of warehouse servers 103 The method includes connecting a database 120 to the plurality of warehouse servers 103, wherein the database 120 is configured to record a UGV location and an availability status of each of the UGVs (110*a*, 110*b*), a UAV location and an availability status of each of the UAVs (112*a*, 112*b*), a robot status of each of the first plurality of robots 107*a*, a robot status of each of the second plurality of robots 107*b*, a shelf location, an availability status of each package and a package identifier for each package The method includes monitoring, by system administrator computer station 104 operatively connected to the plurality of servers, the UGV location and availability status, the UAV location and availability status, the availability status of each package, a package inventory and ordering supplies of the package inventory The method includes receiving, by the plurality of warehouse servers 103, a plurality of package orders each including a package delivery address The method includes saving the package order with the package delivery address in the database 120 The method includes publishing an order topic for each of the plurality of package orders. For each package order, the method includes searching the database 120 to determine an availability of the package of the package order. The method includes retrieving the shelf location and the package identifier. The method includes subscribing to a UGV status topic of each of the UGVs (110_a_, 110_b_), wherein the UGV status topic includes an availability and a location of each UGV. The method includes subscribing to a UAV status topic of each of the UAVs (112_a_, 112_b_), wherein the UAV status topic includes an availability and a location of each UAV. The method includes determining, by a simulated annealing procedure, a UGV which is closest to the shelf location and available to retrieve the package and a UAV which is closest to the shelf location and available to deliver the package to the package delivery address. The method includes publishing a UGV identifier of the UGV closest to the shelf location to a UGV package path topic. The method includes publishing a UAV identifier of the UAV closest to the shelf location to a UAV path topic. The method includes calculating a transfer path for the UGV closest to the shelf location to retrieve the package from the shelf location and deliver the package to a UAV landing pad for the UAV closest to the shelf location, and publish a UGV to UAV package path topic. The method includes subscribing, by each UGV, to the order topic, listening for its UGV identifier, retrieving the package identifier from the order topic, subscribing to the UGV package path topic, retrieving the transfer path, retrieving the package from the shelf location, subscribing to the UGV to UAV path topic, autonomously delivering the package to the UAV landing pad for the UAV closest to the shelf location, and publishing on the package status topic that the package was delivered to the UAV landing pad. The method includes subscribing, by each UAV, to the package status topic, listening for its UAV identifier, subscribing to the package position topic, moving to the UAV landing pad, picking up the package, publishing the package identifier and updating the package status on the package status topic and autonomously flying the package to the package delivery address, delivering the package and publishing to the package status topic that the package was delivered.

In an aspect, the method includes housing, in a warehouse, the U-shaped conveyor belt 108, the first plurality of robots 107_a_, the second plurality of robots 107_b_, an inventory receiving area configured with package stacks which store the package inventory and a plurality of shelving units (109_a_, 109_b_) each including an array of shelves, wherein each shelf is configured to hold one package. The method further includes locating each robot of the first plurality of robots 107_a_ between a package stack and the U-shaped conveyor belt 108, wherein each robot of the first plurality of robots 107_a_ is configured to remove a package from the package stack and place the package on the U-shaped conveyor belt 108. The method further includes locating each robot of the second plurality of robots 107_b_ at an assigned workstation between a respective shelving unit and the U-shaped conveyor belt 108, wherein each of the second plurality of robots 107_b_ is configured to remove each package from the U-shaped conveyor belt 108 as it arrives in front of the assigned workstation, place the package on one of the shelves of the respective shelving unit and publish a package position topic including the package identifier and the shelf location to a package position topic.

Next, further details of the hardware description of the computing environment of FIG. 1 according to exemplary embodiments is described with reference to FIG. 7.

Figure 7:
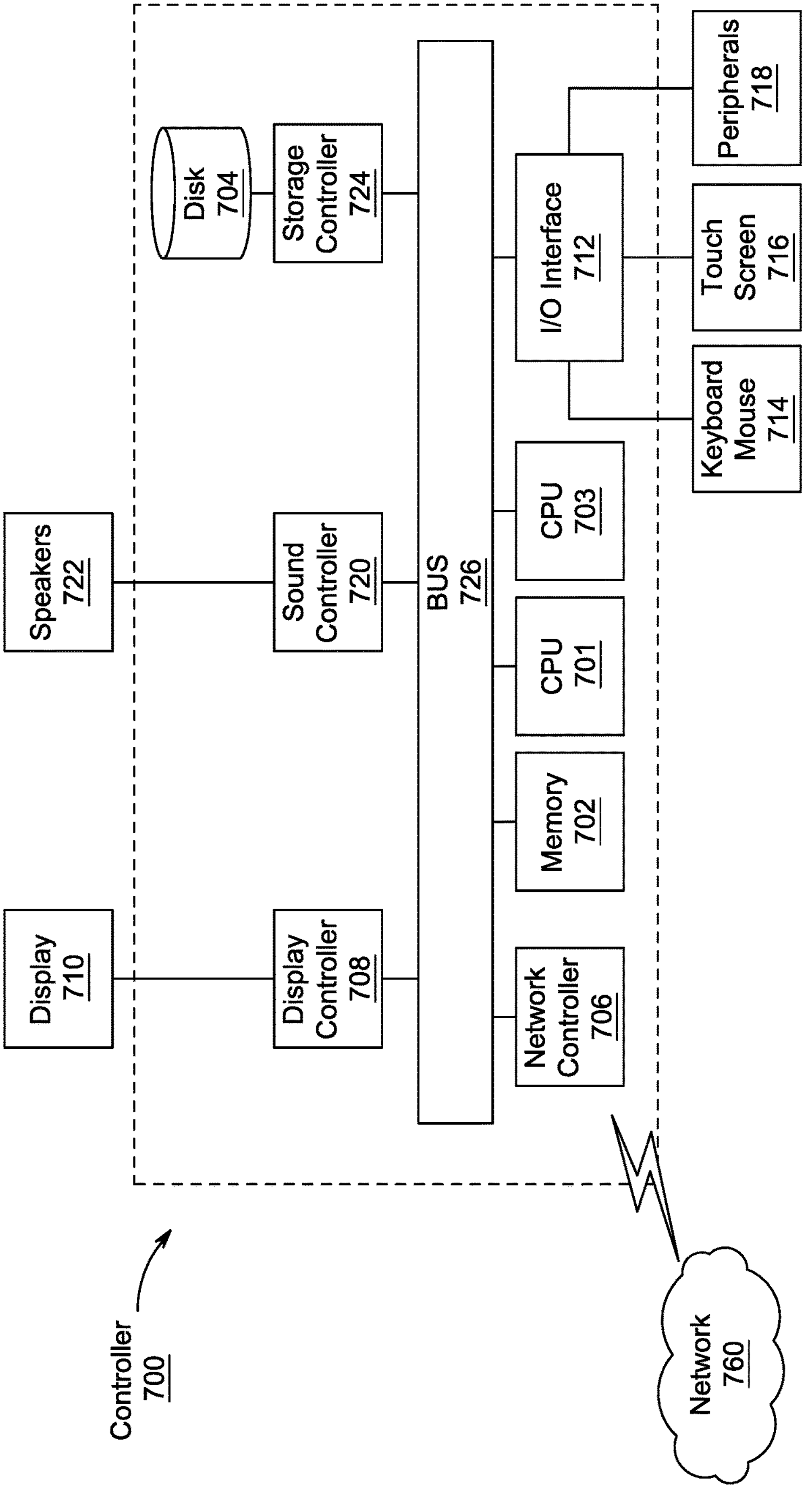
FIG. 7 is an illustration of a non-limiting example of details of computing hardware used in the computing system, according to certain embodiments.

In FIG. 7, a controller 700 is described as representative of the autonomous warehouse package delivery communication system 100 of FIG. 1 in which each of the plurality of warehouse servers 103, the first plurality of robots 107_a_, the second plurality of robots 107_b_, the plurality of UGVs (110_a_, 110_b_), and the plurality of UAVs (112_a_, 112_b_) is a computing device which includes a CPU 701 which performs the processes described above/below. FIG. 7 is an illustration of a non-limiting example of details of computing hardware used in the computing system, according to exemplary aspects of the present disclosure. In FIG. 7, a controller 700 is described which is a computing device and includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of the ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
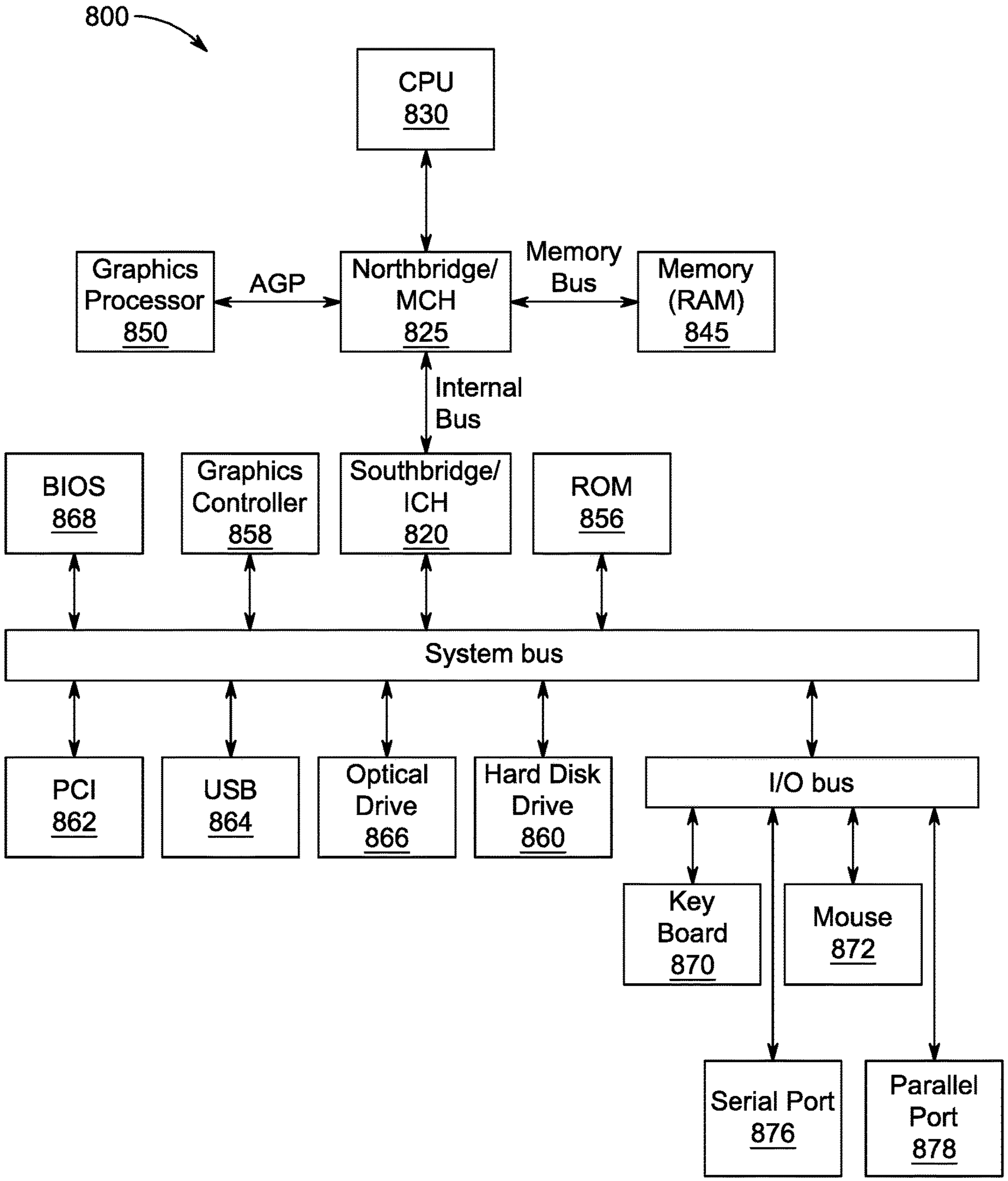
FIG. 8 is an exemplary schematic diagram of a data processing system used within the computing system, according to certain embodiments.

FIG. 8 shows a schematic diagram of a data processing system 800 used within the computing system, according to exemplary aspects of the present disclosure. The data processing system 800 is an example of a computer in which code or instructions implementing the processes of the illustrative aspects of the present disclosure may be located.

In FIG. 8, data processing system 880 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
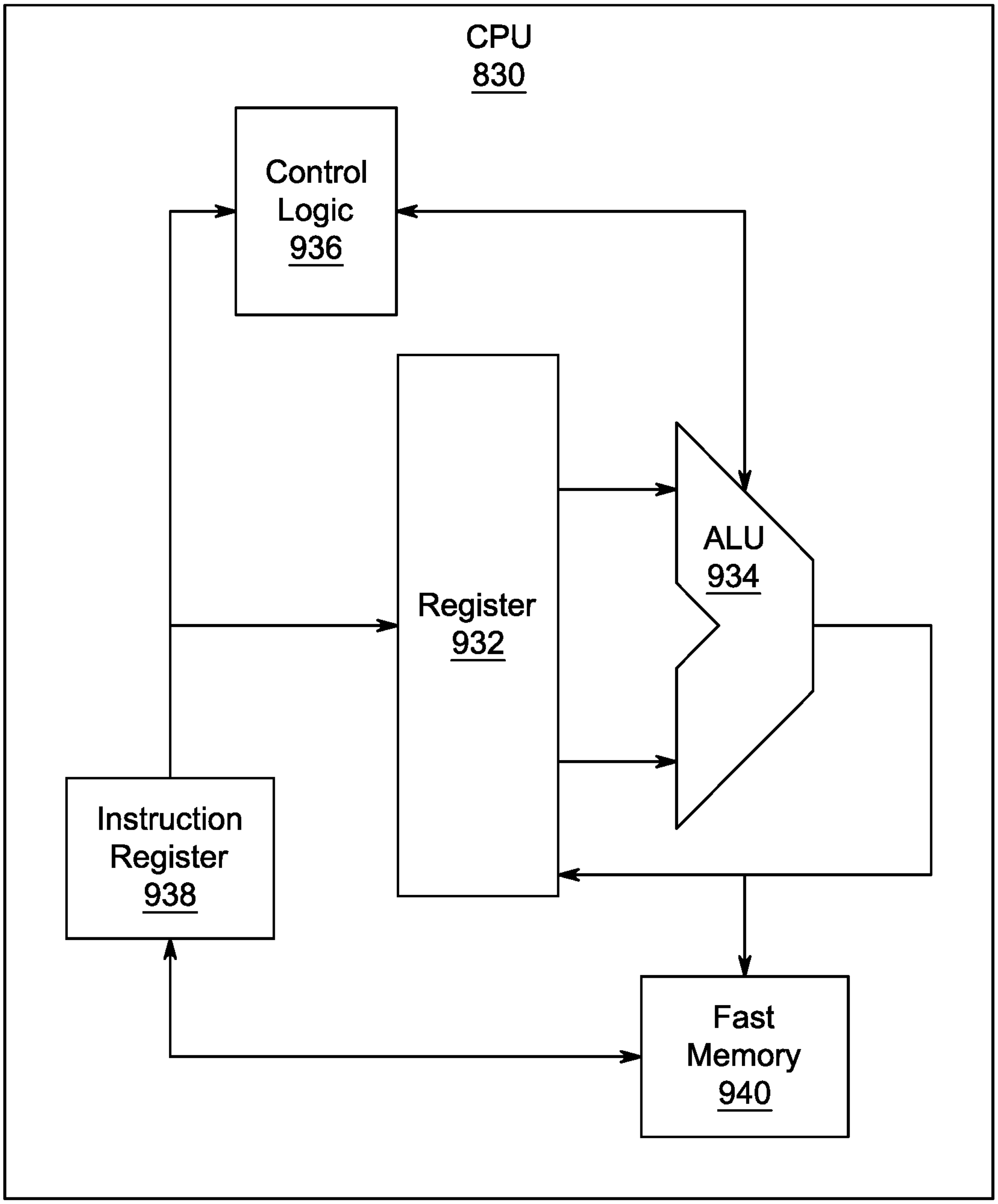
FIG. 9 is an exemplary schematic diagram of a processor used with the computing system, according to certain embodiments.

For example, FIG. 9 shows one aspects of the present disclosure of CPU 830. In one aspects of the present disclosure, the instruction register 938 retrieves instructions from the fast memory 940. At least part of these instructions is fetched from the instruction register 938 by the control logic 936 and interpreted according to the instruction set architecture of the CPU 830. Part of the instructions can also be directed to the register 932. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain aspects of the present disclosures, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 880 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 856 can use, for example, an integrated drive electronics (IDE) or serial advanced technology attachment (SATA) interface. In one aspect of the present disclosure the I/O bus can include a super I/O (SIO) device.

Further, the hard disk drive (HDD) 860 and optical drive 866 can also be coupled to the SB/ICH 820 through a system bus. In one aspects of the present disclosure, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
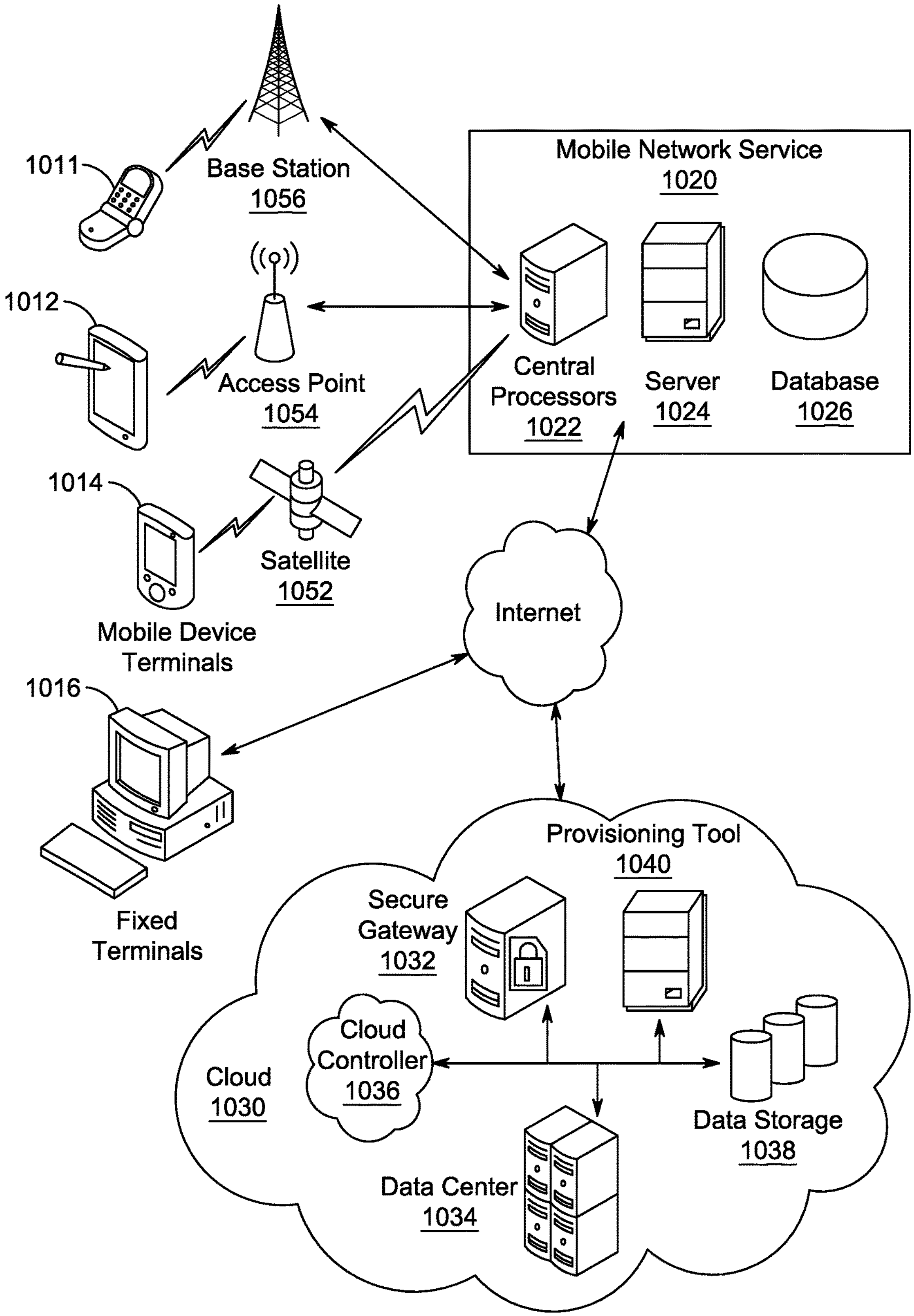
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). More specifically, FIG. 10 illustrates client devices including smart phone 1011, tablet 1012, mobile device terminal 1014 and fixed terminals 1016. These client devices may be commutatively coupled with a mobile network service 1020 via base station 1056, access point 1054, satellite 1052 or via an internet connection. Mobile network service 1020 may comprise central processors 1022, server 1024 and database 1026. Fixed terminals 1016 and mobile network service 1020 may be commutatively coupled via an internet connection to functions in cloud 1030 that may comprise security gateway 1032, data center 1034, cloud controller 1036, data storage 1038 and provisioning tool 1040. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An autonomous warehouse package delivery communication system, comprising:

a U-shaped conveyor belt, a first plurality of robots, a second plurality of robots, a plurality of unmanned ground vehicles (UGVs), a plurality of unmanned aerial vehicles (UAVs), and a plurality of warehouse servers communicatively connected by a real-time data distribution middleware network, wherein the real-time data distribution middleware network is configured to use a publish/subscribe protocol; and a database operatively connected to the plurality of warehouse servers, wherein the database is configured to record a UGV location and an availability status of each of the UGVs, a UAV location and an availability status of each of the UAVs, a robot status of each of the first plurality of robots, a robot status of each of the second plurality of robots, a shelf location, an availability status of each package and a package identifier for each package, wherein the plurality of warehouse servers is configured to:

receive a plurality of package orders each including a package delivery address, save the package order with the package delivery address in the database, and publish an order topic for each of the plurality of package orders;

for each package order:

search the database to determine an availability of the package of the package order, retrieve the shelf location and the package identifier, subscribe to a UGV status topic of each of the UGVs, wherein the UGV status topic includes an availability and a location of each UGV, subscribe to a UAV status topic of each of the UAVs, wherein the UAV status topic includes an availability and a location of each UAV, determine, by a simulated annealing procedure, a UGV which is closest to the shelf location and available to retrieve the package and a UAV which is closest to the shelf location and available to deliver the package to the package delivery address, publish a UGV identifier of the UGV closest to the shelf location to a UGV package path topic, publish a UAV identifier of the UAV closest to the shelf location to a UAV path topic, calculate a transfer path for the UGV closest to the shelf location to retrieve the package from the shelf location and deliver the package to a UAV landing pad for the UAV closest to the shelf location, and publish a UGV to UAV package path topic, wherein each UGV is configured to subscribe to the order topic, listen for its UGV identifier, retrieve the package identifier from the order topic, subscribe to the UGV package path topic, retrieve the transfer path, retrieve the package from the shelf location, subscribe to the UGV to UAV path topic, autonomously deliver the package to the UAV landing pad for the UAV closest to the shelf location, and publish on the package status topic that the package was delivered to the UAV landing pad;

wherein each UAV is configured to subscribe to the package status topic, listen for its UAV identifier, subscribe to the package position topic, move to the UAV landing pad, pick up the package, publish the package identifier and update the package status on the package status topic and autonomously fly the package to the package delivery address, deliver the package and publish to the package status topic that the package was delivered.

2. The autonomous warehouse package delivery communication system of claim 1, wherein each of the U-shaped conveyor belt, the first plurality of robots, the second plurality of robots, the plurality of UGVs, the plurality of UAVs and the plurality of warehouse servers are configured as one or both of a publisher of data topics and a subscriber to data topics.

3. The autonomous warehouse package delivery communication system of claim 1, further comprising: a system administrator computer station connected to the plurality of warehouse servers, wherein the system administrator computer station is configured to monitor the UGV status, monitor the UAV status, monitor the package status topic, monitor a package inventory and order supplies of the package inventory.

4. The autonomous warehouse package delivery communication system of claim 3, further comprising:

a warehouse including the U-shaped conveyor belt, the first plurality of robots, the second plurality of robots and an inventory receiving area configured with package stacks which store the package inventory;

wherein each robot of the first plurality of robots is located between a package stack and the U-shaped conveyor belt, wherein each robot of the first plurality of robots is configured to remove a package from the package stack and place the package on the U-shaped conveyor belt.

5. The autonomous warehouse package delivery communication system of claim 4, further comprising:

a plurality of shelving units located in the warehouse, wherein each shelving unit includes an array of shelves, wherein each shelf is configured to hold one package;

wherein each robot of the second plurality of robots is located at an assigned workstation between a respective shelving unit and the U-shaped conveyor belt, wherein each of the second plurality of robots is configured to remove each package from the U-shaped conveyor belt as it arrives in front of the assigned workstation, place the package on one of the shelves of the respective shelving unit and publish a package position topic including the package identifier and the shelf location to a package position topic.

6. The autonomous warehouse package delivery communication system of claim 4, wherein:

the UAV landing pad closest to the shelf location is one of a plurality of UAV landing pads located outside of the warehouse; and each UAV is assigned to a UAV landing pad and is configured to taxi to the assigned UAV landing pad and pick up the package when the package is delivered to the assigned UAV landing pad by one of the UGVs.

7. The autonomous warehouse package delivery communication system of claim 1, further comprising:

an intranet configured to connect each of the U-shaped conveyor belt, the first plurality of robots, the second plurality of robots, the plurality of unmanned ground vehicles (UGVs), the plurality of unmanned aerial vehicles (UAVs), and the plurality of warehouse servers to the real-time data distribution middleware network.

8. The autonomous warehouse package delivery communication system of claim 1, further comprising:

a global positioning receiver located within a navigation system of each UAV, wherein the global positioning receiver is configured to determine the location of the UAV periodically and publish the location of the UAV to the UAV status topic.

9. An autonomous warehouse package delivery system, comprising:

a warehouse including:

a U-shaped conveyor belt;

a plurality of shelving units configured to store packages;

a plurality of package stacks;

a first plurality of robots;

a second plurality of robots;

a plurality of unmanned aerial vehicles (UAV) landing pads located outside of the warehouse;

a plurality of unmanned ground vehicles (UGV), wherein each UGV is configured to autonomously pick up a package from the shelf, navigate to one of the UAV landing pads, and place the package on the UAV landing pad;

a plurality of UAVs configured to travel to the UAV landing pad and pick up a package from the UAV landing pad, autonomously fly to a package delivery address and release the package at the package delivery address;

a plurality of warehouse servers; and a real-time data distribution middleware network connected to the U-shaped conveyor belt, the first plurality of robots, the second plurality of robots, the plurality of UGVs, the plurality of UAVs and the plurality of servers, wherein the real-time data distribution middleware network is configured to use a publish/subscribe protocol to facilitate direct communication among the U-shaped conveyor belt, the first plurality of robots, the second plurality of robots, the plurality of UGVs, the plurality of UAVs and the plurality of warehouse servers.

10. The autonomous warehouse package delivery system of claim 9, wherein each of the U-shaped conveyor belt, the first plurality of robots, the second plurality of robots, the plurality of UGVs, the plurality of UAVs and the plurality of warehouse servers are configured as one or both of a publisher of data topics and a subscriber to data topics.

11. The autonomous warehouse package delivery system of claim 9, further comprising:

a system administrator computer station connected to the plurality of warehouse servers, wherein the system administrator computer station is configured to monitor a UGV status topic, monitor a UAV status topic, monitor a package status topic, monitor a package inventory and order supplies of the package inventory.

12. The autonomous warehouse package delivery system of claim 9, wherein:

each robot of the first plurality of robots is located between a respective package stack and the U-shaped conveyor belt, wherein each robot of the first plurality of robots is configured to remove a package from a respective package stack and place the package on the U-shaped conveyor belt, and each robot of the second plurality of robots is located between a respective shelving unit and an assigned workstation in front of the U-shaped conveyor belt, wherein each of the second plurality of robots is configured to remove each package from the U-shaped conveyor belt as it arrives in front of the assigned workstation and place the package on a shelf of the respective shelving unit.

13. The autonomous warehouse package delivery system of claim 9, further comprising:

a database operatively connected to the plurality of warehouse servers, wherein the database is configured to record a UGV location and an availability status of each of the UGVs, a UAV location and an availability status of each of the UAVs, a robot status of each of the first plurality of robots, a robot status of each of the second plurality of robots, a shelf location, an availability status of each package and a package identifier for each package.

14. The autonomous warehouse package delivery system of claim 13, wherein:

the plurality of warehouse servers is configured to receive a plurality of package orders each including a package delivery address, save the package order with the package delivery address in the database, and publish an order topic for each of the plurality of package orders.

15. The autonomous warehouse package delivery system of claim 14, wherein the plurality of warehouse servers is further configured to, for each package order:

search the database to determine an availability of the package of the package order, retrieve the shelf location and the package identifier, subscribe to a UGV status topic of each of the UGVs, wherein the UGV status topic includes an availability and a location of each UGV, subscribe to a UAV status topic of each of the UAVs, wherein the UAV status topic includes an availability and a location of each UAV, determine, by a simulated annealing procedure, a UGV which is closest to the shelf location and available to retrieve the package and a UAV which is closest to the shelf location and available to deliver the package to the package delivery address, publish a UGV identifier of the UGV closest to the shelf location to a UGV package path topic, publish a UAV identifier of the UAV closest to the shelf location to a UAV path topic, calculate a transfer path for the UGV closest to the shelf location to retrieve the package from the shelf location and deliver the package to the UAV landing pad for the UAV closest to the shelf location, and publish a UGV to UAV package path topic, wherein each UGV is configured to subscribe to the order topic, listen for its UGV identifier, retrieve the package identifier from the order topic, subscribe to the UGV package path topic, retrieve the transfer path, retrieve the package from the shelf location, subscribe to the UGV to UAV path topic, autonomously deliver the package to the UAV landing pad for the UAV closest to the shelf location, and publish on the package status topic that the package was delivered to the UAV landing pad;

wherein each UAV is configured to subscribe to the package status topic, listen for its UAV identifier, subscribe to the package position topic, taxi to the UAV landing pad, pick up the package, publish the package identifier and update the package status on the package status topic and autonomously fly the package to the package delivery address, deliver the package and publish to the package status topic that the package was delivered.

16. The autonomous warehouse package delivery system of claim 15, wherein:

the UAV landing pad closest to the shelf location is one of a plurality of UAV landing pads located outside of the warehouse;

each UAV is assigned to a UAV landing pad and is configured to taxi to its landing pad and pick up the package when the package when the package is delivered to the UAV landing pad by one of the UGVs.

17. The autonomous warehouse package delivery system of claim 9, further comprising:

an intranet configured to connect each of the U-shaped conveyor belt, the first plurality of robots, the second plurality of robots, the plurality of UGVs, the plurality of UAVs, and the plurality of warehouse servers to the real-time data distribution middleware network.

18. The autonomous warehouse package delivery system of claim 17, further comprising:

a global positioning receiver located within a navigation system of each UAV, wherein the global positioning receiver is configured to determine the location of the UAV periodically and publish the location of the UAV to a UAV status topic.

19. An autonomous warehouse package delivery communication method, comprising:

connecting a real-time data distribution middleware network to a U-shaped conveyor belt, a first plurality of robots, a second plurality of robots, a plurality of unmanned ground vehicles (UGVs), a plurality of unmanned aerial vehicles (UAVs), and a plurality of warehouse servers;

using, by the real-time data distribution middleware network, a publish/subscribe protocol to facilitate communication among the first plurality of robots, the second plurality of robots, the plurality of unmanned ground vehicles (UGVs), the plurality of unmanned aerial vehicles (UAVs), and the plurality of warehouse servers;

connecting a database to the plurality of warehouse servers, wherein the database is configured to record a UGV location and an availability status of each of the UGVs, a UAV location and an availability status of each of the UAVs, a robot status of each of the first plurality of robots, a robot status of each of the second plurality of robots, a shelf location, an availability status of each package and a package identifier for each package;

monitoring, by system administrator computer station operatively connected to the plurality of servers, the UGV location and availability status, the UAV location and availability status, the availability status of each package, a package inventory and ordering supplies of the package inventory;

receiving, by the plurality of warehouse servers, a plurality of package orders each including a package delivery address;

saving the package order with the package delivery address in the database;

publishing an order topic for each of the plurality of package orders;

for each package order:

searching the database to determine an availability of the package of the package order;

retrieving the shelf location and the package identifier;

subscribing to a UGV status topic of each of the UGVs, wherein the UGV status topic includes an availability and a location of each UGV;

subscribing to a UAV status topic of each of the UAVs, wherein the UAV status topic includes an availability and a location of each UAV;

determining, by a simulated annealing procedure, a UGV which is closest to the shelf location and available to retrieve the package and a UAV which is closest to the shelf location and available to deliver the package to the package delivery address;

publishing a UGV identifier of the UGV closest to the shelf location to a UGV package path topic;

publishing a UAV identifier of the UAV closest to the shelf location to a UAV path topic;

calculating a transfer path for the UGV closest to the shelf location to retrieve the package from the shelf location and deliver the package to a UAV landing pad for the UAV closest to the shelf location, and publish a UGV to UAV package path topic;

subscribing, by each UGV, to the order topic, listening for its UGV identifier, retrieving the package identifier from the order topic, subscribing to the UGV package path topic, retrieving the transfer path, retrieving the package from the shelf location, subscribing to the UGV to UAV path topic, autonomously delivering the package to the UAV landing pad for the UAV closest to the shelf location, and publishing on the package status topic that the package was delivered to the UAV landing pad; and subscribing, by each UAV, to the package status topic, listening for its UAV identifier, subscribing to the package position topic, moving to the UAV landing pad, picking up the package, publishing the package identifier and updating the package status on the package status topic and autonomously flying the package to the package delivery address, delivering the package and publishing to the package status topic that the package was delivered.

* * * * *